(12) United States Patent
Perrett et al.

(10) Patent No.: US 10,791,034 B2
(45) Date of Patent: Sep. 29, 2020

(54) TELECOMMUNICATIONS NETWORK PLANNING

(71) Applicant: ARIA NETWORKS LIMITED, Bath (GB)

(72) Inventors: Jay Perrett, Chippenham (GB); Arthur Wade, Chippenham (GB); John Crickett, Chippenham (GB)

(73) Assignee: ARIA NETWORKS LIMITED, Bath (GB)

( * ) Notice: Subject to any disclaimer, the term of this patent is extended or adjusted under 35 U.S.C. 154(b) by 516 days.

(21) Appl. No.: 15/531,315

(22) PCT Filed: Nov. 27, 2015

(86) PCT No.: PCT/GB2015/053636
§ 371 (c)(1),
(2) Date: May 26, 2017

(87) PCT Pub. No.: WO2016/083838
PCT Pub. Date: Jun. 2, 2016

(65) Prior Publication Data
US 2017/0346701 A1 Nov. 30, 2017

(30) Foreign Application Priority Data
Nov. 28, 2014 (GB) .................................. 1421170.0

(51) Int. Cl.
*H04L 12/24* (2006.01)
*H04L 12/721* (2013.01)
*H04L 12/703* (2013.01)

(52) U.S. Cl.
CPC .......... *H04L 41/145* (2013.01); *H04L 41/147* (2013.01); *H04L 45/123* (2013.01); *H04L 45/28* (2013.01)

(58) Field of Classification Search
CPC ..... H04L 41/145; H04L 41/147; H04L 45/28; H04L 45/123
(Continued)

(56) References Cited

U.S. PATENT DOCUMENTS 8,265,061 B1 9/2012 Smith et al.
8,811,172 B1 8/2014 Sella
(Continued)

FOREIGN PATENT DOCUMENTS

CN 104036324 A 9/2014
EP 1 005 195 A2 5/2000
(Continued)

OTHER PUBLICATIONS

Naas et al., "A Novel MILP Formulation for Planning GMPLS Transport Networks with Conversion and Regeneration Capabilities", 2008 IEEE, BNSDOCID: <XP___31286028A__1_>, Apr. 5, 2008, pp. 569-574.
(Continued)

*Primary Examiner* — Eunhee Kim
(74) *Attorney, Agent, or Firm* — Dentons US LLP

(57) ABSTRACT

A method of simulating a scenario in a telecommunications network is provided. The method comprises: generating a network definition expressed in a common data model readable by first and second routing engines; generating a set of demand matrices describing demands on the network; incorporating a scenario definition into one or more of the network definition and the demand matrices; automatically determining a first aspect of a new network state associated with the scenario definition by determining a first optimised set of routes using the first routing engine based on the network definition and at least one of the demand matrices; and automatically determining a second aspect of the new network state by determining a second optimised set of
(Continued)

routes using the second routing engine based on the first optimised set of routes and at least one other of the demand matrices.

20 Claims, 24 Drawing Sheets

(58) Field of Classification Search
USPC .......................................................... 703/13
See application file for complete search history.

(56) References Cited

U.S. PATENT DOCUMENTS

| | | |
|---|---|---|
| 2003/0147400 A1 | 8/2003 | Devi |
| 2006/0013127 A1 | 1/2006 | Izaiku et al. |
| 2006/0050634 A1 | 3/2006 | Gous |
| 2007/0025730 A1 | 2/2007 | Frankel |
| 2007/0177506 A1 | 8/2007 | Singer et al. |
| 2008/0080374 A1 | 4/2008 | Nuzman et al. |
| 2008/0320166 A1 | 12/2008 | Filsfils et al. |
| 2010/0040365 A1 | 2/2010 | Kit Leung |
| 2011/0004455 A1 | 1/2011 | Caviglia et al. |
| 2011/0122776 A1 | 5/2011 | Jacob et al. |
| 2011/0173486 A1 | 7/2011 | Yagyu |
| 2011/0307899 A1 | 12/2011 | Lee et al. |
| 2012/0185229 A1* | 7/2012 | Perrett .................. G06N 3/126 703/13 |
| 2012/0287937 A1 | 11/2012 | Kaya et al. |
| 2013/0090124 A1 | 4/2013 | Panchal et al. |
| 2013/0346578 A1 | 12/2013 | Varki et al. |
| 2014/0052419 A1 | 2/2014 | Wang et al. |
| 2014/0078895 A1* | 3/2014 | Iovanna .................. H04L 45/22 370/228 |
| 2016/0036693 A1 | 2/2016 | Galdy et al. |
| 2016/0036886 A1 | 2/2016 | Ito |

FOREIGN PATENT DOCUMENTS

| | | |
|---|---|---|
| EP | 2 521 392 A1 | 11/2012 |
| EP | 2 602 961 A1 | 6/2013 |
| EP | 2742648 | 6/2014 |
| EP | 2 996 285 A1 | 3/2016 |
| GB | 2 386 033 A | 9/2003 |
| WO | WO 2008/112252 A1 | 9/2008 |
| WO | WO 2011/036500 A2 | 3/2011 |
| WO | WO 2011/085823 A1 | 7/2011 |
| WO | WO 2012/116760 A1 | 9/2012 |
| WO | WO 2013/024269 A1 | 2/2013 |
| WO | WO 2014/086978 A1 | 6/2014 |
| WO | WO 2014/161571 A1 | 10/2014 |
| WO | WO 2014/189952 A2 | 11/2014 |

OTHER PUBLICATIONS

Sabella et al., "A Multilayer Solution for Path Provisioning in New-Generation Optical/MPLS Networks", Journal of Lightwave Technology, vol. 21, No. 5, May 2003, pp. 1141-1155.

Iovanna et al., "Multilayer Control for Packet-Optical Networks [Invited]", J. Opt. Commun. Netw./vol. 5, No. 10/Oct. 2013, pp. A86-A99.

European Examination Report, dated Sep. 26, 2018, issued in corresponding European Application No. 15 804 923.9, 9 pages.

* cited by examiner

PRIOR ART

PRIOR ART

PRIOR ART

PRIOR ART

PRIOR ART

| | | Link ID | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | 1 | | 2 | | 3 | | 4 | | 5 | | 7 | | 9 | | 10 | | 11 | | 12 | | 13 | | 14 | | 15 | | 17 | | 17 | | 19 | 23 | 24 | 2 |
| | | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd | Bwd | Fwd |
| Node ID | 2 | 0 | 0 | 0 | 0 | 1 | 1 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 0 | 0 | 0 | 0 | 0 | 0 |
| | 3 | 0 | 0 | 1 | 1 | 0 | 0 | 0 | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 1 |
| | 4 | 0 | 0 | 0 | 0 | 0 | 0 | 1 | 1 | 1 | 1 | 1 | 1 | 0 | 0 | 1 | 1 | 0 | 0 | 0 | 0 | 1 | 1 | 1 | 1 | 1 | 1 | 0 | 0 | 0 | 0 | 0 | 0 | 0 | 0 |
| | 5 | 1 | 1 | 0 | 0 | 0 | 0 | 0 | 0 | 0 | 0 | 1 | 1 | 0 | 0 | 1 | 1 | 1 | 1 | 0 | 0 | 1 | 1 | 0 | 0 | 0 | 0 | 1 | 1 | 0 | 0 | 1 | 1 | 1 | 0 |
| | 6 | 1 | 1 | 1 | 1 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 1 | 1 | 0 | 0 | 0 | 0 |

54

| | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost | Link ID | Cost |
|---|---|---|---|---|---|---|---|---|---|---|---|---|---|---|---|---|---|---|---|---|---|---|---|---|---|---|---|---|---|---|---|---|
| fw_cost | 1 | 1 | 2 | 1 | 3 | 1 | 4 | 1 | 5 | 1 | 8 | 1 | 9 | 10 | 10 | 1 | 11 | 10 | 12 | 1 | 13 | 1 | 14 | 1 | 15 | 1 | 17 | 1 | 18 | 1 | 19 | 1 | 23 | 10 | 24 | 10 |

Figure 4C

TELECOMMUNICATIONS NETWORK PLANNING

CROSS-REFERENCE TO RELATED APPLICATIONS

This application is a National Stage of PCT/GB2015/053636, filed Nov. 27, 2015, which claims priority under 35 U.S.C. § 119 to GB Application No. 1421170.0, filed Nov. 28, 2014, all of which are incorporated herein by reference in their entirety.

FIELD OF THE INVENTION

This invention relates to simulating a scenario in a telecommunications network. The invention uses routing engine technology and is suited for planning for possible failure scenarios and possible scenarios involving an increase in demands on the network.

BACKGROUND

There is a need to model networks such as data transport networks for effective network planning. For example, in the case of planning for possible network failures, it is useful to understand how traffic will be routed in the event of a failure such as a broken fibre optic cable or other connection. The modelling of large networks for answering questions relating to failure analysis and growth planning is a complex problem.

A range of custom tools have been developed by network equipment vendors for modelling the flow of traffic on data transport networks. For example, Juniper and Infinera have developed tools for modelling aggregated, long haul traffic across national scale data transport networks. For cities, network modelling tools are vendor and technology specific. For example, Cisco and Alcatel-Lucent are manufacturers of access network products and have each created custom tools for modelling switched traffic in cities. On the level of individual data centres in a city, custom tools have been created by enterprises such as Hewlett-Packard Company (HP), International Business Machines Corporation (IMB) and VMWare.

Since the tools are custom built for networks of different scales and different technologies, they are not compatible with each other and cannot exchange data easily, if at all. Referring to FIGS. 1A and 1B, in order to model interactions between a national network 10, a city network 12, and a data centre 14 (i.e. different 'domains'), separate network planning tools 16 are required and a dialogue between the tools 16 must be facilitated. Each tool 16 creates a report 18 which is operated upon by a translator 20 before a translated report 22 is input to one of the other tools 16. The need for a bespoke translation process between tools 16 creates a barrier to modelling the interaction between network domains.

A similar situation exists when modelling the interaction between different layers of a multilayer data transport network. For example, a multilayer data transport network may comprise an Internet Protocol (IP) layer 24 and an optical layer 26, as shown in FIG. 2A. In order to model an interaction between the IP and optical layers of a large multilayer network, the dialogue between an IP planning tool 28 and an optical planning tool 30 must also be facilitated. For example, referring to FIG. 2B a link failure scenario in the optical layer 26 may be modelled by the optical planning tool 30 and a report 32 produced. A translator 34 operates on the report 32 to convert it into a translated report 36 that can be processed by the IP planning tool 28. A similar translating step is required for a report 38 generated by the IP planning tool 28 before it can be input to the optical planning tool 30.

For large networks the activity of modelling using different tools and translating between them can take days. In this case it is not possible to model failure or other scenarios in real time to determine the impact of a failed link across all the layers of a network, or to determine the impact of a data centre router failing in a data centre in Chicago on the aggregated traffic in the long haul trunks across the United States of America (USA).

Another important application of network modelling is growth forecasting. As demands grow, networks must be extended, for example by adding extra capacity to support predicted demands. Typically, network operators expand their networks periodically, for example every six months, based on predicted demands for that planning horizon. The process is repeated every six months and thus the network is expanded incrementally over a period of years. For example, with reference to FIGS. 3A and 3B, an IP network 40 may be modelled by inputting predicted demands 42 for the next six months into an IP planning tool 44 to generate a growth plan 46 for the network 40. This approach has some merit but is limited because interim demands are not necessarily best served by a network based on a particular set of future demands, and the choice of the planning horizon is not optimised.

It is accordingly an object of the invention to provide an improved technique for modelling a network for network planning.

SUMMARY OF THE INVENTION

In a first aspect of the invention there is provided a method of simulating a scenario in a telecommunications network, the method comprising: generating a network definition expressed in a common data model readable by first and second routing engines; generating a set of demand matrices describing demands on the network; incorporating a scenario definition into one or more of the network definition and the demand matrices; automatically determining a first aspect of a new network state associated with the scenario definition by determining a first optimised set of routes using the first routing engine based on the network definition and at least one of the demand matrices; and automatically determining a second aspect of the new network state by determining a second optimised set of routes using the second routing engine based on the first optimised set of routes and at least one other of the demand matrices.

Preferably, the method comprises controlling the determining of the first and second optimised sets of routes using a control module.

Preferably, the method comprises the routing engine retrieving the scenario definition from a database.

Preferably, each of the first and second routing engines is a generic routing engine.

Preferably, the scenario definition comprises a failed network element.

Preferably, the failed network element comprises a failed network link.

Preferably, the new network state comprises an adapted network state comprising adapted routing of traffic around the failed network element.

Preferably, the network comprises a plurality of layers and the first aspect of the new network state comprises adapted routing of traffic in a same layer as the failed network element.

Preferably, the second aspect of the new network state comprises adapted routing of traffic in a different layer as the failed network element.

Preferably, the adapted routing of traffic in the different layer is based on adapted properties of the different layer.

Preferably, the adapted properties of the different layer are based on the adapted routing of traffic in the same layer as the failed network element.

Preferably, the adapted properties of the different layer comprise adapted capacities, latencies or costs of routes in the different layer.

Preferably, the method comprises inputting an output of the second routing engine into a third routing engine for determining adapted routing of traffic in a further different layer of the network.

Preferably, the network comprises a plurality of domains and the first aspect of the new network state comprises adapted routing of traffic in a same domain as the failed network element.

Preferably, the second aspect of the new network state comprises adapted routing of traffic in a different domain as the failed network element.

Preferably, the adapted routing of traffic in the different domain is based on adapted demands on the different domain.

Preferably, the adapted demands on the different domain are based on the adapted routing of traffic in the same domain as the failed network element.

Preferably, the method comprises inputting an output of the second routing engine into a third routing engine for determining adapted routing of traffic in a further different domain of the network.

Preferably, scenario definition comprises a first set of predicted demands on the network in a first future window of time.

Preferably, the first set of predicted demands is expressed in a first demand matrix.

Preferably, the new network state comprises an adapted network state comprising enhanced capacity for accommodating the first set of predicted demands.

Preferably, the first aspect of the new network state comprises routing of traffic based on the enhanced capacity and the first set of predicted demands.

Preferably, the second aspect of the new network state comprises routing of traffic based on the enhanced capacity and a second set of predicted demands on the network in a second future window of time, the second future window of time being earlier than the first future window of time.

Preferably, the method comprises inputting an output of the second routing engine into a third routing engine for determining routing of traffic based on the enhanced capacity and a third set of predicted demands on the network in a third future window of time, the third window of time being earlier than the second future window of time.

Preferably, the method comprises using an output of the simulation to control one or more components of the network.

In a second aspect of the invention there is provided a method of simulating a scenario in a telecommunications network, the method comprising: inputting a scenario definition based on the scenario to a first routing engine; automatically applying the first routing engine for determining a first aspect of a network adaptation in response to the scenario; and automatically cross-feeding an output of the first routing engine into a second routing engine for determining a second aspect of the network adaptation.

Preferably, applying the first routing engine comprises determining a first optimised set of routes through the network based on the scenario definition.

Preferably, the output of the first routing engine comprises the first optimised set of routes.

Preferably, the method comprises applying the second routing engine to determine a second optimised set of routes across the network based on the output of the first routing engine.

In a third aspect of the invention there is provided a method of simulating a failure event in a multilayer telecommunications network, the method being implemented by a computer and comprising the steps of: automatically simulating a failed network element in a first layer of the network by adjusting a data model describing the network; automatically simulating rerouting of traffic in the first layer based on the failed network element using a first routing engine; automatically updating the simulated properties of a second layer of the network based on the rerouted traffic in the first layer by adjusting the data model describing the network, wherein the second layer is served by the first layer; and automatically simulating rerouting of traffic in the second layer based on the updated properties of the second layer using a second routing engine.

Preferably, the method comprises rerouting traffic in the network based on the automatically simulated rerouting of traffic in the first layer and on the automatically simulated rerouting of traffic in the second layer.

In a fourth aspect of the invention there is provided a method of simulating a failure event across multiple domains of a telecommunications network, the method being implemented by a computer and comprising the steps of: automatically simulating a failed network element in a first domain of the network by adjusting a data model describing the network; automatically simulating rerouting of traffic in the first domain based on the failed network element using a first routing engine; automatically updating a demand matrix for a second domain of the network by adjusting a data model describing the network, wherein the second domain is interfaces with the first domain; and automatically simulating rerouting of traffic in the second domain based on the updated demand matrix for the second domain using a second routing engine.

Preferably, the method comprises rerouting traffic in the network based on the automatically simulated rerouting of traffic in the first domain and on the automatically simulated rerouting of traffic in the second domain.

In a fifth aspect of the invention there is provided a method of simulating a capacity change of a telecommunications network, the method being implemented by a computer and comprising the steps of: generating a data model of the network that describes existing capacity of the network and potential future capacity of the network; generating a first predicted demand matrix based a prediction of future demands on the network; automatically routing predicted traffic through the network based on the first predicted demand matrix and the data model using a first routing engine; automatically outputting a first future network based on the first predicted demand matrix; automatically generating a second predicted demand matrix based on a prediction of future demands on the network, wherein the second predicted demand matrix relates to demands predicted for an earlier time than those of the first predicted demand matrix; and automatically testing the first future network by routing predicted traffic based on the second predicted demand matrix and the first future network using a second routing engine.

In a sixth aspect of the invention there is provided a system for simulating a scenario in a telecommunications network, the method comprising: network definition module for generating a network definition expressed in a common data model readable by first and second routing engines; a demands module for generating a set of demand matrices describing demands on the network; a scenario definition module for incorporating a scenario definition into one or more of the network definition and the demand matrices; a first routing engine for automatically determining an aspect of a new network state associated with the scenario definition by determining a first optimised set of routes based on the network definition and one of the demand matrices; and a second routing engine for automatically determining a further aspect of the new network state by determining a second optimised set of routes based on the first optimised set of routes and another of the demand matrices.

Preferably, the first and second routing engines have a master-slave relationship in which one of them acts as an orchestrator comprising a control module for controlling the other.

Preferably, the first and second routing engines have a peer relationship in which both are controlled by a control module.

Preferably, the system comprises a common database accessible by each routing engine for storing the network definition, the demand matrices, and/or the scenario definition.

Preferably, the system comprises for each routing engine, a respective database accessible by the each routing engine for storing a respective subset of the network definition, the demand matrices, and/or the scenario definition.

In a seventh aspect of the invention, there is provided a system for simulating a failure event in a multilayer telecommunications network, the system comprising: a failure definition module for automatically simulating a failed network element in a first layer of the network by adjusting a data model describing the network; a first routing engine for automatically simulating rerouting of traffic in the first layer based on the failed network element; a network definition module for automatically updating one or more simulated properties of a second layer of the network based on the rerouted traffic in the first layer by adjusting the data model describing the network, wherein the second layer is served by the first layer; and a second routing engine for automatically simulating rerouting of traffic in the second layer based on the updated properties of the second layer.

Preferably, the system is configured to reroute traffic in the network based on the automatically simulated rerouting of traffic in the first layer and on the automatically simulated rerouting of traffic in the second layer.

In an eighth aspect of the invention there is provided a system for simulating a failure event across multiple domains of a telecommunications network, the system comprising: a failure definition module for automatically simulating a failed network element in a first domain of the network by adjusting a data model describing the network; a first routing engine for automatically simulating rerouting of traffic in the first domain based on the failed network element; a network definition module for automatically updating a demand matrix for a second domain of the network by adjusting a data model describing the network, wherein the second domain is interfaces with the first domain; and a second routing engine for automatically simulating rerouting of traffic in the second domain based on the updated demand matrix for the second domain.

Preferably, the system is configured to reroute traffic in the network based on the automatically simulated rerouting of traffic in the first domain and on the automatically simulated rerouting of traffic in the second domain.

In a ninth aspect of the invention there is provided a system for simulating a capacity change of a telecommunications network, the system comprising: a network definition module for generating a data model of the network that describes existing capacity of the network and potential future capacity of the network; a predicted demands module for generating a first predicted demand matrix based a prediction of future demands on the network and for generating a second predicted demand matrix based on a prediction of future demands on the network, wherein the second predicted demand matrix relates to demands predicted for an earlier time than those of the first predicted demand matrix; a first routing engine for automatically routing predicted traffic through the network based on the first predicted demand matrix and the data model and for automatically outputting a first future network based on the first predicted demand matrix; and a second routing engine for automatically testing the first future network by routing predicted traffic based on the second predicted demand matrix through the first future network.

In a tenth aspect of the invention there is provided computer program code which when run on a computer causes the computer to perform a method according to any of the first to fifth aspects of the invention.

In an eleventh aspect of the invention there is provided a carrier medium carrying computer readable code which when run on a computer causes the computer to perform a method according to any of the first to fifth aspects of the invention.

In a twelfth aspect of the invention there is provided a computer program product comprising computer readable code according to the tenth aspect of the invention.

In a thirteenth aspect of the invention there is provided an integrated circuit configured to perform a method according to any of the first to fifth aspects of the invention.

In a fourteenth aspect of the invention there is provided an article of manufacture for detecting a selected mode of household use, the article comprising: a machine-readable storage medium; and executable program instructions embodied in the machine readable storage medium that when executed by a programmable system causes the system to perform a method according to any of the first to fifth aspects of the invention.

In a fifteenth aspect of the invention there is provided a device comprising: a machine-readable storage medium; and executable program instructions embodied in the machine readable storage medium that when executed by a programmable system causes the system to perform a method according to any of the first to fifth aspects of the invention.

DESCRIPTION OF THE DRAWINGS

The invention will now be described in detail with reference to the following drawings of which:

FIGS. 4A, 4B and 4C are respectively a network diagram and tables illustrating an example network and a data structure for describing the network using vectors and matrices suitable for use in embodiments of the invention;

Throughout the drawings, like reference symbols refer to like features or steps.

DETAILED DESCRIPTION OF THE INVENTION

Embodiments of the invention use an approach in which a complex network modelling problem is broken down into multiple smaller routing problems. Routing engines such as network planning tools or generic routing engines are used to compute the multiple routing problems, with each routing engine computing one or more of the routing problems and a final result being generated based on the output of two or more of the routing engines. In this approach, the routing engines collaborate in the sense that when a first routing engine solves one of the multiple routing problems its computational output is used as the input for a second routing engine to solve another of the multiple routing problems.

To enable the output of the first routing engine to be used as the input of the second routing engine, the routing engines use a common data-driven model for describing the network and the routing problems. Thus, data can be exchanged between the routing engines without the need for a bespoke translation operation between them. The data-driven model can not only describe the structure of the network, but also the availability of capacity on the network and the service demands being requested. The routing engines together perform a collaborative computation with one or more of the routing engines operating on inputs which are outputs of one or more others of the routing engines.

Figure 4A:
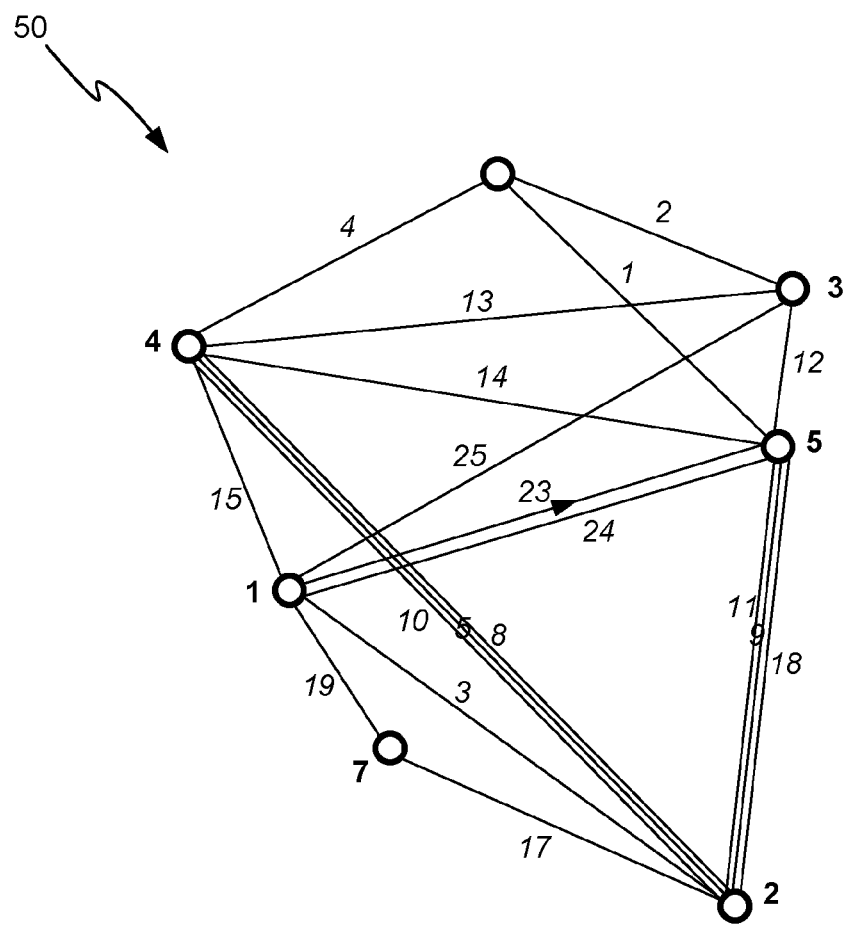
Figure 4B:
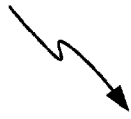

The data-driven model comprises a predefined data structure for describing the network, the capacity available on the network, and the service demands being placed on the network. For example, properties of the network 50 shown in FIG. 4A may be described by numbering the nodes 1 to 7 (shown as circles) and the links 1 to 25 (shown as straight lines connecting the circles). Using this numbering, properties of the network may be expressed in the form of vectors and matrices which the routing engines can use as inputs for routing computations. For example, referring to FIG. 4B, a connectedness matrix 52 describing the network 50 has columns for links and rows for nodes. There is a column for each unidirectional link. As a result, each bidirectional link is represented by two columns—'Fwd' and 'Bwd'—and each unidirectional link, such as link 23, is represented by a single column—'Fwd'. The cells of the matrix take values of zero or one depending on whether the link of the column is connected to the node of the row. For example, referring to the forward direction of link 1 (i.e. the first column), the cells taking a value of 1 are in the rows for nodes 5 and 6. This indicates that the forward direction of link 1 connects nodes 5 and 6. Taking the forward direction of link 3 as another example, a value of 1 is taken by the cell in the row representing node 2. There are no other cells in this column that take a value of 1 but this implies that the other end of the forward direction of link 3 is connected to node 1 which is not represented by a row in the matrix 52. Thus, the matrix 52 fully represents the connectedness of the network 50 using a number of rows that is one fewer than the number of nodes.

Other properties of the network may be similarly represented by other matrices or vectors. For example, the cost of each of the links may be represented by a vector 54 as shown in FIG. 4C. In the vector 54 the values taken by the elements of the vector are a link identifier (ID) followed by an indication of the cost of the identified link, followed by another link ID and then the cost of that other link, and so on. Alternatively, a similar link cost vector could simply include values of the links in a predefined order—thus taking the form $[c_1, c_2, c_3, \ldots]$. Other properties of the links, such as capacity and utilisation, may similarly be represented by vectors.

Vectors are also used to represent the properties of nodes—for example, the capacity of a node, the physical location coordinates of a node, the Internet Protocol (IP) address of a node, and whether a node is exempt from protection.

Properties of a set of services S1 to Sn may be represented by a vector—for example by listing the values of properties such as the maximum delay, required bandwidth and network layer of each of the services in a predefined order. The routes taken by services S1 to Sn across a network may be represented by matrices either with reference to the links of the network or to the nodes of the network. For example, a matrix with a row for each service and a column for each link will have a 1 in a cell if that service uses that link, and a zero if it does not. Similarly, a matrix with a row for each service and a column for each node can define routes taken by each of the services by indicating for each service whether or not the node is used. Primary and secondary routes, as well as point-to-point services and point-to-multipoint services and IP flows can be represented by matrices in this way.

A vector may also be used to represent a series of properties of the network as a whole. For example, properties such as whether load balancing is allowed in the network, adjacency limit (i.e. the maximum number of links that can be connected to a single node), and total network utilisation may be listed in a predetermined order to form a vector describing a network. A modelling vector may be similarly defined to describe rules for network modelling. For example, parameters used in evolving an optimal routing solution (described in more detail below) could include parameters for defining an asymptote, parameters defining predetermined weights for mutations, and a parameter defining genepool size (these terms are defined below).

This data structure can be used for calculating properties of the network and services. For example, a dot product of a link utilisation vector indicating the fractional utilisation of the capacity of each link and a link capacity vector indicating the total capacity of each link will produce a scalar value representing the total network utilisation. Since the values taken by the elements of the vectors and matrices are binary, the data structure requires very little memory for storing and computing properties of the network and services. The nature of the data structure also makes it very straight forward to add further information such as other properties of the links and nodes because the data structure is pre-defined.

The data-driven model may provide a generic representation of a data transport network that is common for different data transport technologies, in which case the model can be instantiated for the technology mix under consideration and a generic routing product can be applied for computing routing solutions for the data transport technologies of the mix. This approach brings together information technology (IT)—e.g. data centres—and telecommunications—e.g. radio and fibre optics—for common planning and management. Thus, unlike the traditional approach in which different technologies are modelled using bespoke tools, the approach described here gives end-to-end visibility of the multi-technology networking estate.

Not only can different technology types, such as different layers of a network, be modelled using the data structure, but also different geographical aspects of a network can be modelled. For example, at a highest level of abstraction, an intercity data transport network can be represented in which each node represents a large city or other large point of presence (POP) and each link represents an intercity right of way, duct or existing cabling. At the next level of detail, a separate network model can be used to represent the routers, optical devices, and IP and optical links of a city. At the next level of detail, another network model can be used to represent a data centre as a network of aggregation switches, top of rack routers, firewalls, load balancers and other data centre devices.

It will be appreciated that by simply changing the data, the network model can be rapidly and easily configured and reconfigured. This is possible because the different networks (IP layer, optical layer, intercity, city, data centre, etc) share the same structural principles but differ in the data needed to instantiate them. This enables common modelling of different technologies and different scales of interest, as well as computing interactions between the network layers and city and intercity networks. The data structure is also suitable for modelling a virtual network—i.e. a geographically distributed, software defined network (SDN).

Embodiments of the invention use a data driven representation of capacity. In this context, a capacity is defined as a unit on the network which may be consumed. For example, a capacity could be a unit of bandwidth, a port, a wavelength (i.e. channel), a unit of power, and so on. Consumable units can also be provided by virtual SDN enabled devices such as a virtual firewall or virtual router. Since capacities are consumed according to usage patterns, for example with the consumption of one type of capacity depending on or implying the consumption of another type of capacity, capacities are related to each other by various relationships such as parent-child relationships, consequential relationships and disjoint relationships. To represent this, capacity groups are defined for representing a related group of capacities on the network and for describing how they are related and how they are consumed. Some capacity groups are node capacity groups and could for example describe the consumable items in an IP/optical rack with multiple ports, input cables and output cables. Other capacity groups are link capacity groups and similarly describe the consumable items associated with the link, such as power for signal boosting, channels or wavelengths, capacity on certain channels, and so on. Embodiments of the invention also use 'capacity group templates' comprising rules for creating capacity group instances including rules for how the different capacity types are consumed. To represent a capacity group, a suitable capacity group template is populated by instance data. The language for defining a capacity group template is rich enough to describe all the possible capacity relationships. If capacity or capacity type in a capacity group template indicates cost, economic modelling can be included as part of the optimisation.

Demands for services on the network are represented by populating service consumption templates by instance data. A 'service' is defined here as a vehicle to consume capacity and not necessarily an end user service. For example, services may include an aggregated digital subscriber line (DSL) load, a virtual machine (VM), a virtual network function (VNF), or a group of VNFs, i.e. a service chain. A 'service consumption template' (SCT) describes a service type and how this service type consumes capacity from the available capacity groups. Usually a service type consumes capacity from multiple physical and logical capacity groups.

In embodiments of the invention, instance data is used to populate the data structure including capacity and service consumption templates, and complex network modelling problems are broken down into smaller routing problems. For example, a complex network modelling problem may be broken down according to different layers of the network, different domains (e.g. intra-city, city, data centre) and also different time frames such as different future windows of time for modelling network growth. Different routing engines are allocated to perform computations for the different network layers, domains or time windows, and the routing engines are networked together to enable them to exchange data for collaboratively solving the complex network modelling problem.

Figure 5A:
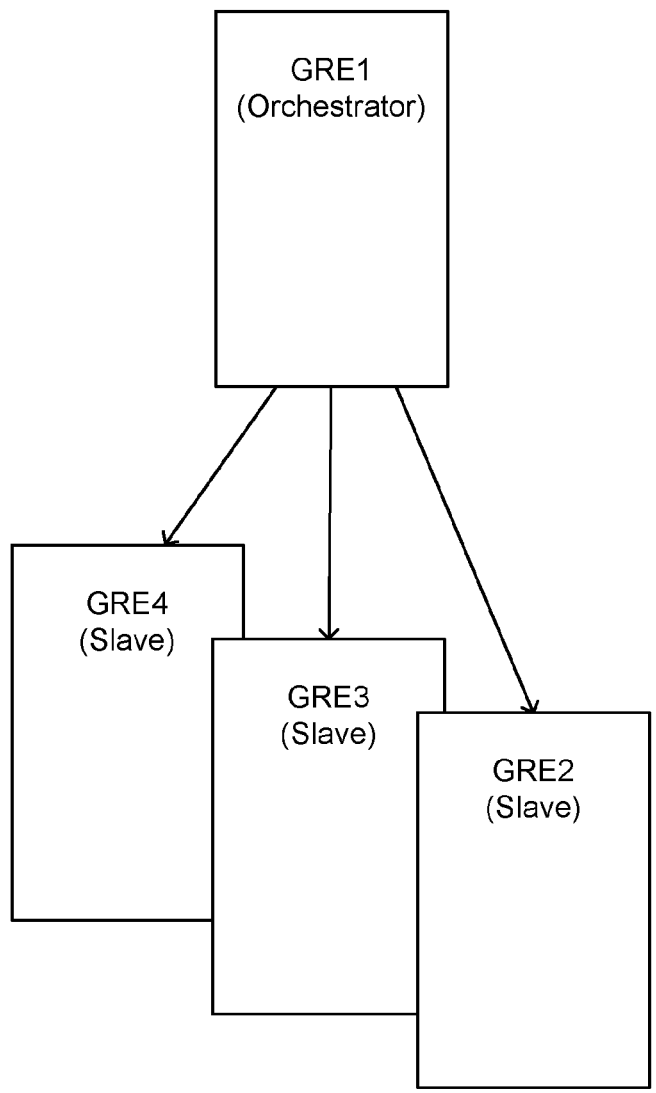
FIGS. 5A, 5B and 5C are a series of block system diagrams showing a plurality of generic routing engines (GREs) networked together in various ways for sharing the computational workload of a complex network planning problem between the GREs according to embodiments of the invention.

Referring to FIG. 5A, four generic routing engines (GREs) may be networked together with GRE1 taking the role of an orchestrator and GREs2-4 taking the roles of slave GREs in a master-slave relationship. Thus, the four GREs are networked together for exchanging data between them, but the orchestrator coordinates the activities of all four GREs and provides instructions for which computations to perform and what input data to provide to each of the slave GREs.

Figure 5B:
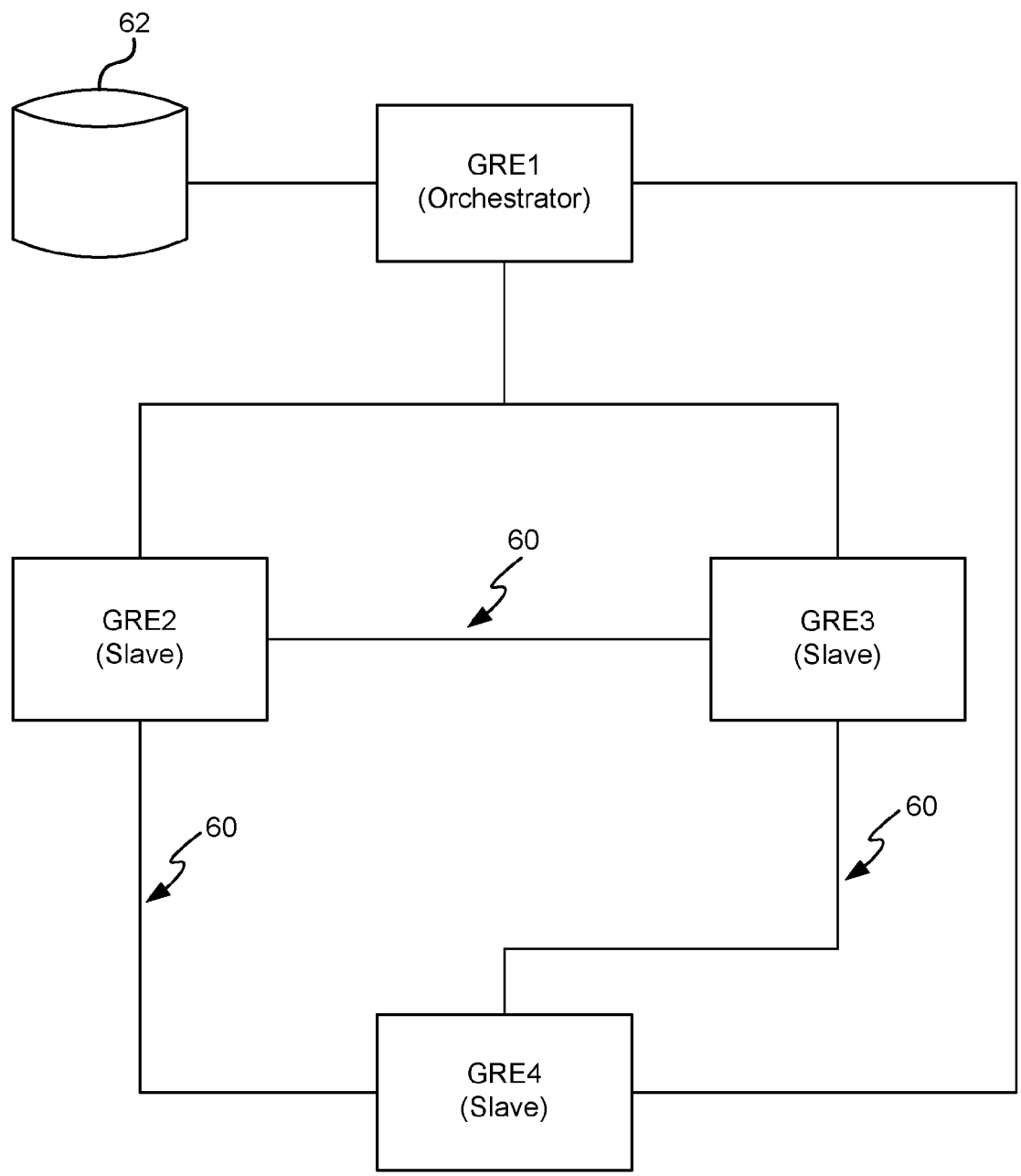

In an alternative arrangement (FIG. 5B), there may be direct connections 60 between the slave GREs and the orchestrator may be connected to a data store 62 storing an instantiated data model.

Figure 5C:
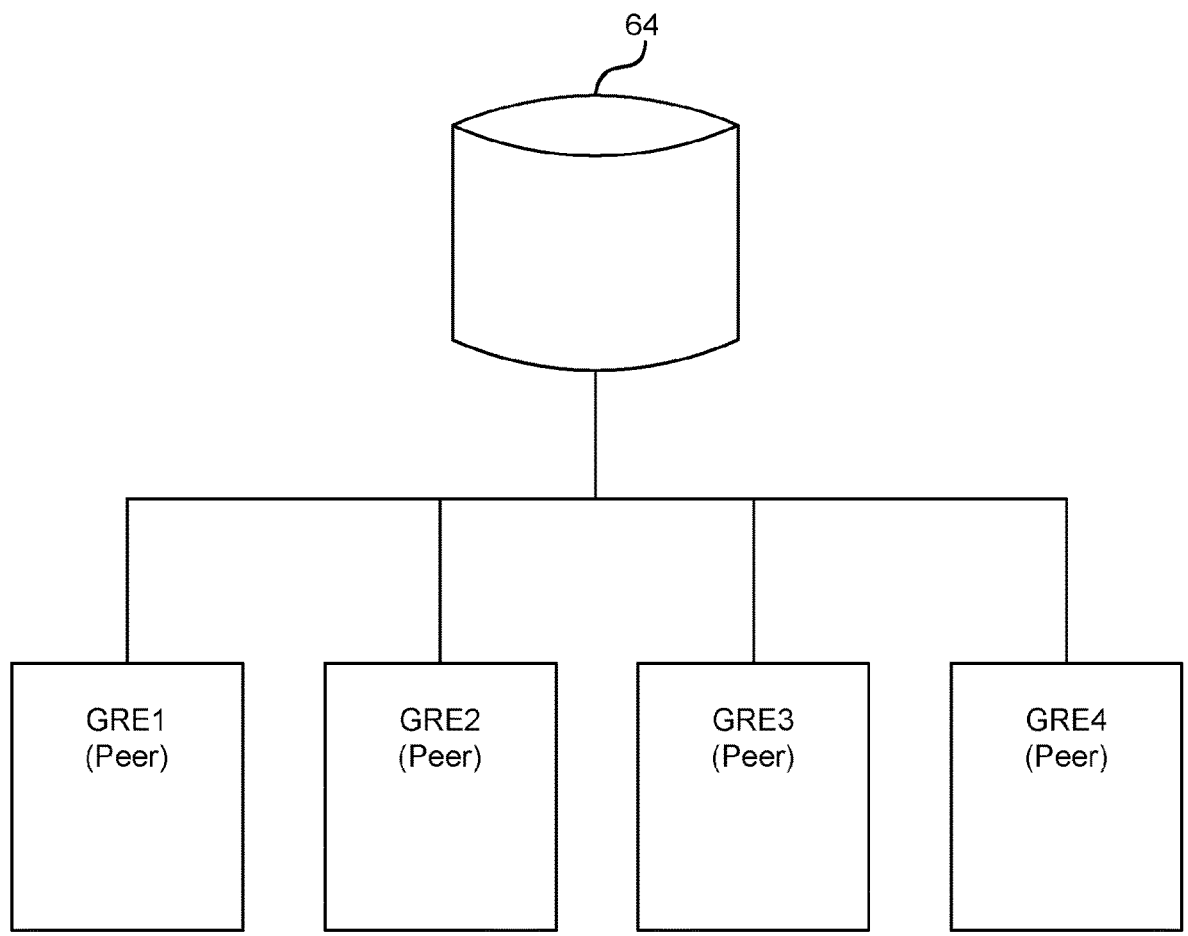

In yet another arrangement (FIG. 5C), the four GREs may be related as peers rather than in a master-slave relationship. Each GRE is connected to each other GRE and to a data store 64 storing an instantiated data model. In other arrangements there may be fewer than or more than four GREs, and the GREs may be networked together in different ways.

Figure 6:
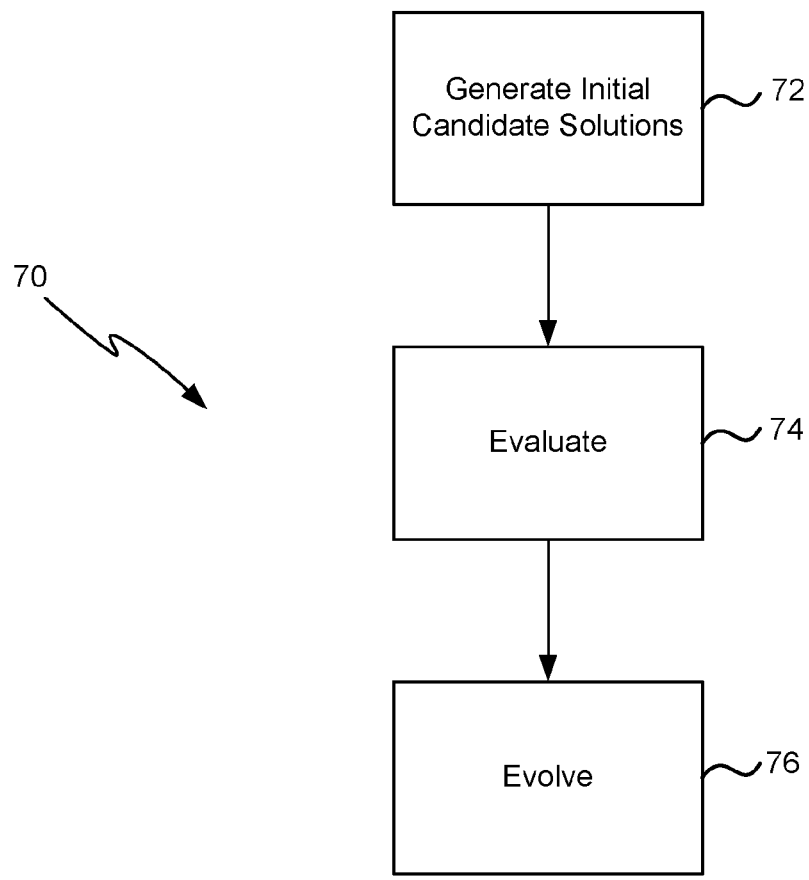
FIG. 6 is a flow chart showing a method of computing an optimum set of routes across a network in accordance with embodiments of the invention.

In order to compute an optimum solution to a routing problem, each GRE processes a network definition including a capacity group for the network and a demand matrix as follows. Referring to FIG. 6, the optimisation process is an iterative process that starts with an initial set of candidate solutions and evolves the set of solutions towards an optimised solution. According to a method 70 of determining an optimum set of routes, a set of candidate solutions for starting the process is generated at step 72. Each candidate solution comprises a set of routes or paths across the network being modelled, their being one path in each set for each respective service requirement of the demand matrix. Thus, each candidate solution offers a potential routing plan for the services of the demand matrix and can be evaluated with respect to the demand matrix to determine how well the routing plan satisfies the requirements of the demand matrix. Each of the initial candidate solutions is evaluated at step 74 by computing a fitness function whose value indicates how well the candidate solution meets the requirements of the demand matrix. This enables the candidate solutions to be compared with each other, for example by ranking them in order of fitness, to establish which candidate solutions best meet the requirements of the demand matrix and which candidate solutions are the weakest solutions.

The initial set of candidate solutions, which may for example contain fifty candidate solutions, is evolved at step 76 towards an optimum solution. This is achieved using an iterative approach that biases the development of the set of candidate solutions towards an optimum. In each iteration, the weakest candidate solutions—i.e. those with the lowest fitness function values—are replaced by new candidate solutions provided that the new candidate solutions have higher fitness functions than the weakest candidate solutions. This tends to increase the quality of the set of candidate solutions as the number of iterations increases, thereby evolving the set so that it becomes increasingly likely that the set includes the optimum solution.

The fitness function may provide a measure of one particular performance parameter, such as bandwidth, or alternatively may take account of two or more performance parameters, for example bandwidth, protection, latency and cost. If there are multiple performance parameters to be evaluated, the fitness function may take account for their relative importance, for example by using weighting coefficients.

To evaluate cost, the fitness function may comprise a function of the difference between the total cost of all routes of a candidate solution and the total budget indicated by a customer. To evaluate latency, the fitness function may comprise a function of the mean difference between delivered latency and requested maximum latency of all routes of a candidate solution. Another example of a performance parameter that may be evaluated is disjointedness. Disjointedness is a measure of how many nodes or links of a candidate solution are shared between different paths of the candidate solution. For example, to evaluate disjointedness, a fitness function may comprise a function of the proportion of the nodes of a candidate solution that are shared between paths of the candidate solution.

In general, it is suitable for the value of the fitness function to be higher for a better performing candidate solution and lower for a weaker candidate solution. For example, the fitness function may take values between 0 and 1, where 1 indicates an optimised solution and 0 indicates a very poor candidate solution.

There is no guarantee that the initial set of randomly generated candidate solutions contains the optimum solution. This would be very unlikely. In order to optimise the routing of services, the candidate solutions are evolved at step 76 using a genetic algorithm towards an optimum solution as follows.

The initial candidate solutions are used as a gene pool that is evolved by an iterative process involving repeated selection of stronger candidate solutions. Thus, with each iteration, the average quality of the candidate solutions increases and it becomes more likely that the gene pool contains the optimum solution.

Figure 7:
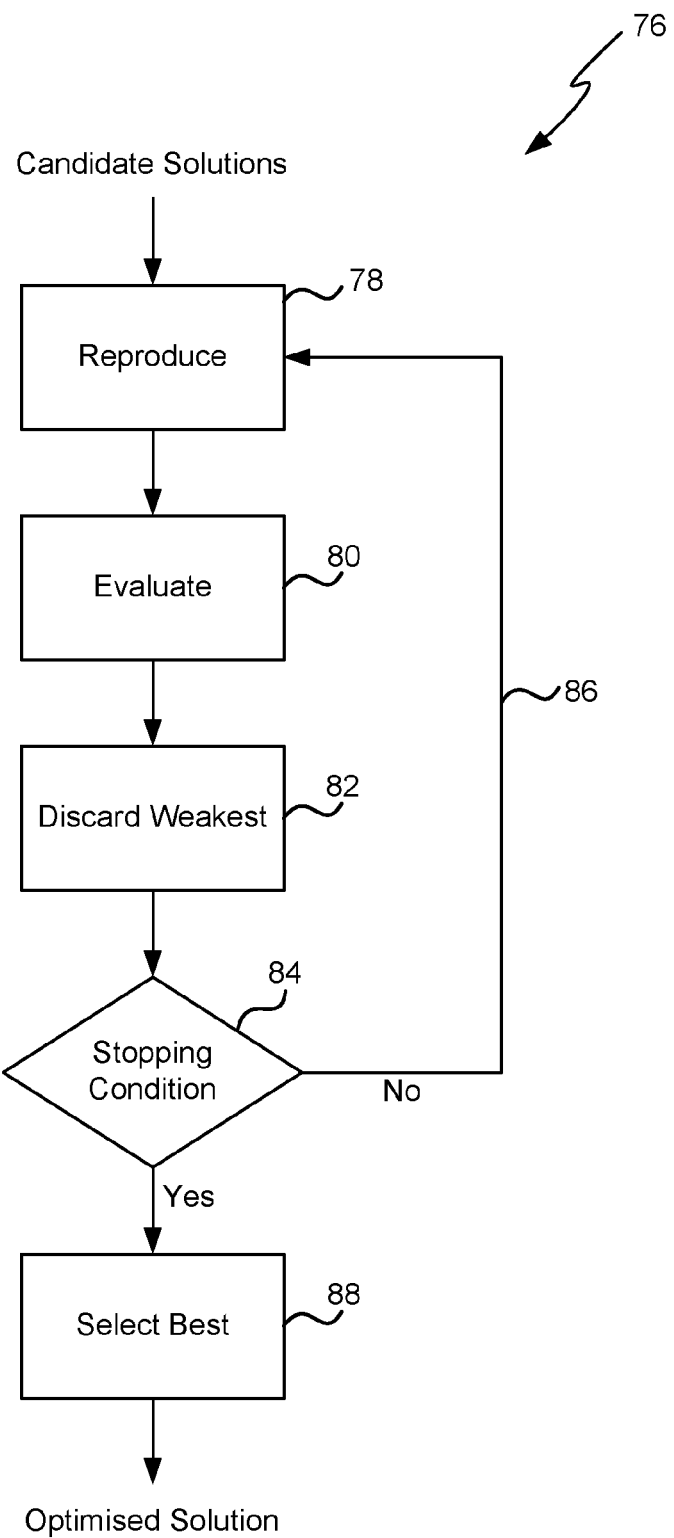
FIG. 7 is a flow chart showing a method of evolving a routing solution towards an optimum set of routes in accordance with the method of FIG. 6.

Referring to FIG. 7, the evolution process (step 76) involves reproducing the candidate solutions at step 78 using a genetic algorithm to produce one or more 'child' candidate solutions from the initial gene pool. The genetic algorithm comprises rules for reproducing the candidate solutions either by mating, mutating or a combination of both.

For example, a pair of child candidate solutions could be created by 'mating' two randomly selected parent candidate solutions. The mating process involves swapping corresponding portions of the parent candidate solutions to create two new child candidate solutions. For example, the routes provided by the parent candidate solutions between a particular source node and a particular destination node could be swapped. Alternatively, portions of routes could be swapped, or any other scrambling of the parent solutions could be carried out. Three or more candidate solutions could be scrambled to produce one or more child candidate solutions.

Another method of reproducing is to mutate a parent candidate solution. In this case, a parent candidate solution, which may be randomly selected from the gene pool, is changed in a random, predetermined, or partially random manner. For example, every fifth node of each route could undergo a random change in functionality (e.g. from an optical cross connect to glass through). It will be appreciated that by mutating a single parent candidate solution, a single child candidate solution is created.

The creation of child candidate solutions increases the size of the gene pool of candidate solutions. For example, if the initial set of candidate solutions contains fifty initial candidate solutions and two child candidate solutions are created, the enlarged gene pool contains fifty-two candidate solutions. At step 80 the child candidate solutions are evaluated, for example by calculating a fitness function of the type described above. The candidate solutions of the enlarged gene pool are now ranked in order of the value of their fitness function, and if n child candidate solutions were created in the reproducing step 78, the weakest n of the enlarged gene pool are discarded (step 82). Following the example above of fifty initial candidate solutions and two child candidate solutions, the fifty-two candidate solutions of the enlarged gene pool are ranked by fitness function value and the weakest two of the enlarged set are discarded. Thus, the total size of the gene pool remains constant over time but the quality of the population improves with cycles of the iteration. At worst, an iteration may produce child candidate solutions that are no better than any of the existing candidate solutions. In that case, the new child candidate solutions will be discarded immediately and the quality of the population, which may for example be expressed as a mean fitness function value, will be unchanged. In any other case an iteration will improve the quality of the population thereby increasing the likelihood that the gene pool contains the optimum routing solution.

The evolution process cycles through iterations by reproducing (step 78), evaluating (step 80), and discarding the weakest candidate solutions (step 82) to maintain a constant population size with each cycle and gradually increase the quality of the population. The gene pool may be said to evolve towards an optimum solution as a result of the bias towards better performing solutions introduced by discarding the weakest candidate solutions in each cycle.

The evolution is stopped when a sufficient number of iterations have been applied to reach a predetermined stopping condition 84. Two suitable stopping conditions are based on reaching a solution sufficiently close to the optimum solution and reaching a gene pool that is likely to contain the optimum solution.

In the first approach, a fitness function or a performance parameter such as cost of the optimum solution is estimated, and the best candidate solution in the gene pool is compared to the optimum to determine how close the best candidate solution to date is to the optimum solution. If the fitness function or performance parameter of the best candidate solution to date is sufficiently close to that of the optimum value, the stopping condition is satisfied and the evolution is stopped.

For example, if the performance parameter is cost, the cost of the best solution to date will go down with each iteration, gradually approaching an asymptote which represents the cost of the optimum solution. At some point the cost of the best solution to date will have reached a value within a predetermined percentage, such as 5%, of the optimum cost, at which point the stopping condition is satisfied. After each round of evolution an asymptote is determined. This becomes more reliable with every round of evolution as it is based on more and more data, and can generally be calculated in a meaningful way from, for example, the tenth round onwards. In order to determine an asymptote, the cost improvement as a function of the number of iterations is approximated as a ratio of two polynomials of the same order. Such a rational function, R, may be expressed as follows.

$$R + \frac{A_0 + A_1 \cdot X + A_2 X^2 + \ldots + A_n X^n}{1 + B_1 X + B_2 X^2 + \ldots + B_n X^n}$$

where X is the number of iterations and $A_0$, $A_1$, $A_2$, ..., $A_n$, $B_0$, $B_1$, $B_2$, ..., $B_n$ are constants to be evaluated to fit the data. As the number of iterations becomes large the cost tends to the asymptote which is $A_n/B_n$. Thus, in order to determine the asymptote, the constants $A_0$, $A_1$, $A_2$, ..., $A_n$, $B_0$, $B_1$, $B_2$, ..., $B_n$ of the polynomials must be computed which can for example be done using a method of least squares. In an example, a best cost to date reaches within 5% of an optimum cost (asymptote) after between 300 and 500 iterations.

In the second approach, the distribution of a fitness function or a performance parameter such as cost is approximated and the value of the fitness function or performance parameter of the best candidate solution to date is compared to the distribution to determine the likelihood that the best candidate solution to date is the optimum solution.

For example, the performance parameter may be cost. The distribution of the cost of all possible routing solutions is approximated based on two assumptions: 1) that the distribution is a normal distribution and 2) that the mean and standard deviation of the initial set of candidate solutions is representative of the mean and standard deviation of all possible candidate solutions. Assumption 2 is justified because the set of initial candidate solutions is generated randomly. Thus, the distribution of the cost of routing solutions is approximated as a normal distribution having a mean and standard deviation the same as the mean and standard deviation of the costs of the initial candidate solutions. The probability that, after any particular number of iterations, the gene pool contains the optimum solution is calculated by iterating the distribution between $-\infty$ and the value of the cost of the best solution to date:

$$P(\text{we have optimum}) = \int_{-\infty}^{best\ to\ date} \text{distribution}$$

Thus, the stopping condition is satisfied when the likelihood of the gene pool containing the optimum routing solution reaches a predetermined percentage, such as 95%.

However, it will be appreciated that a result of 95% based on a small sample size (e.g. a small number of initial candidate solutions) and/or a small number of iterations is likely to be less reliable that a result of 95% based on a large sample size and a large number of iterations. Therefore, a safeguard may be put in place by way of a minimum probability that the optimum solution has not yet been found (where P(optimum not yet found)=1−P(we have optimum)). The minimum probability may comprise a function of the size of the genepool, the number of iterations that have taken place, the standard deviation of the current genepool (which decreases as the genepool evolves), or any combination of the above. For example, the minimum probability that the optimum solution has not yet been found could be defined as:

$$P(\text{optimum not yet found})_{min} = \frac{1}{\sqrt{\text{genepool size} + \text{number of iterations}}}$$

According to this definition of the minimum probability, once the minimum has been reached, further iterations will increase the likelihood that the gene pool contains the optimum but this will happen much more slowly than on previous iterations. This ensures that for a sufficiently small gene pool size, a higher number of iterations may be required before the stopping condition can reached.

Regardless of how the stopping condition is defined, once it is reached the best solution in the gene pool is selected (step 88) and outputted as the optimised solution as shown in FIG. 7.

The approach of breaking down a complex network modelling problem into smaller routing problems using a common data structure and sharing out the computational workload for collaborative computations will now be further described in the context of exemplary use cases.

Figure 8:
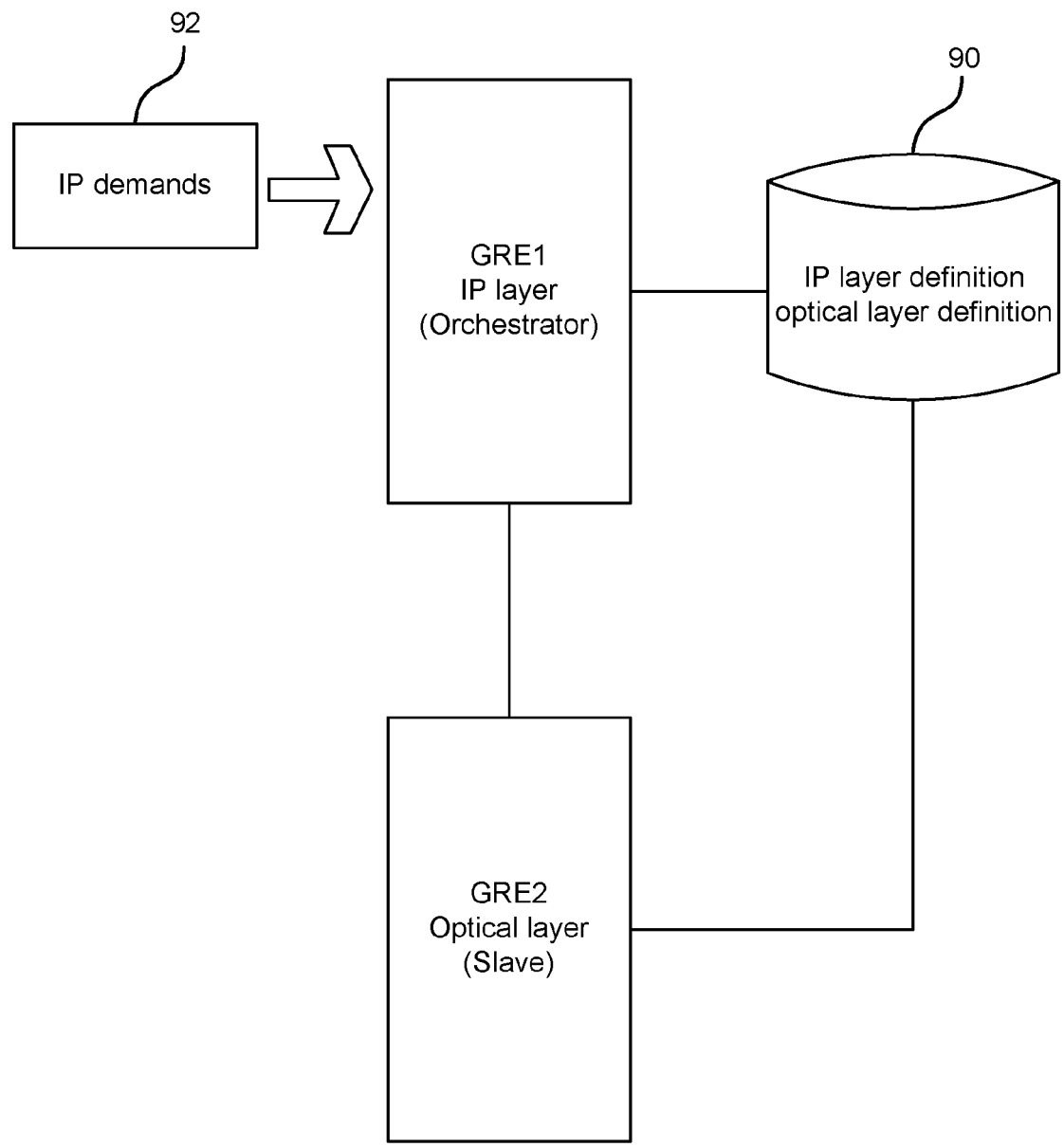
FIG. 8 is a block system diagram showing two GREs networked together for exploring failure scenarios in a multilayer data transport network in accordance with an embodiment of the invention.

For example, the approach can be used for network failure analysis of a multilayer network. Referring to FIG. 8, the computational workload for this use case is divided according to the layers of the network so that GRE1 performs computations relating to the IP layer and GRE2 performs computations relating to the optical layer. In the arrangement of FIG. 8, both GREs 1 and 2 are connected to a data store storing network definitions of the IP and optical layers including capacity information. Both network definitions are expressed in the common data structure. A set of IP demands 92 comprising an IP layer demand matrix are imported by GRE1 and used as an input to the routing computations.

A setting up phase is conducted in which GRE1 computes an optimum set of routes through the IP layer in accordance with the above-described method 70 and stores the IP layer routes in the data store 90 in accordance with the common data model. GRE1 also plays the role of an orchestrator in this arrangement and determines an implied optical layer demand matrix from the IP demands 92 and communicates this to GRE2 together with an instruction that GRE2 is to apply the optical layer demands to the optical layer definition in the data store 90. GRE2, which plays a slave role, receives and executes the instructions from GRE1, and returns a set of optimum optical layer routes to the data store 90. This completes the setting up phase.

A full network model is now stored in the data store 90. With the data model set up, the model can be used for stress testing the network to determine how it delivers services in the event of small failures in certain parts of the network. For example, the data model stored in the data store 90 can be amended to introduce a small failure into the optical layer of the network, such as a failure of a single link in the optical layer. The effects of this failure can be computed for both layers of the network to determine the impact of the failure on traffic flow across both the IP and optical layers.

Figure 9:
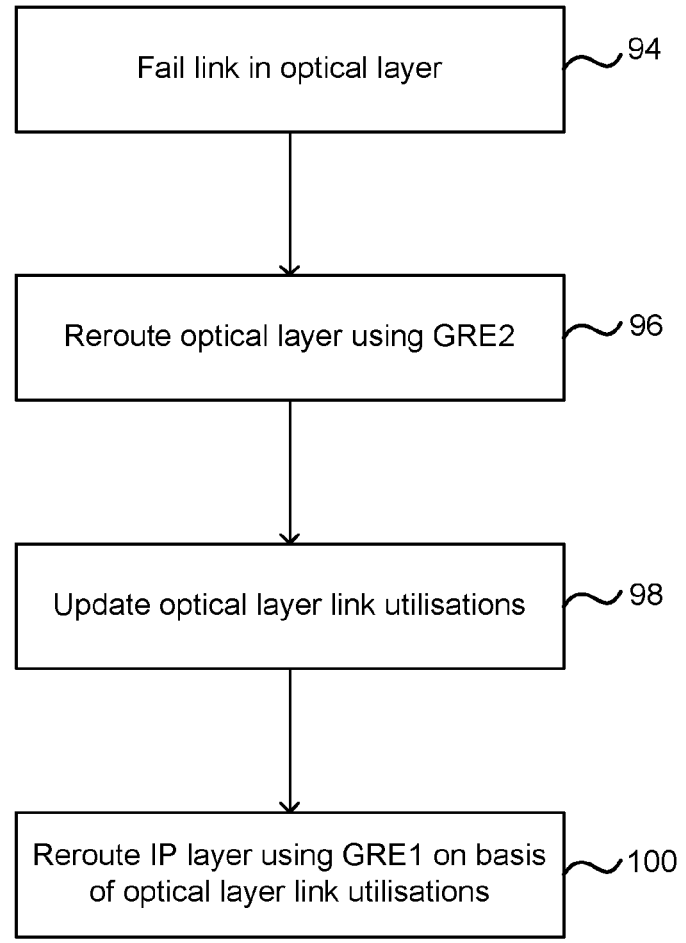
FIG. 9 is a flow chart showing a method of exploring a failed link in an optical layer of the multilayer network.

Referring to FIGS. 8 and 9, in order to perform a link failure use case, a change is made to the data model to simulate a link failure in the optical layer (step 94). This involves making a change to the optical layer definition in the data model. Based on the nature of the data structure the change could be as simple as changing a value in a matrix describing the network from 1 to 0. The change to the optical layer definition is made in the data store 90 under an instruction from GRE1 acting as orchestrator. With this change in place, GRE2 reroutes the optical layer (step 96) by computing a new optimum set of routes for the optical demands and updates the link utilisations of the optical layer in the data model (step 98).

Since the optical layer serves the IP layer, the rerouting in the optical layer has an effect on how the IP layer is served, and therefore an effect on the properties of the IP layer. This effect will be described below in relation to FIGS. 10A-10C. As far as the data model is concerned, the optical layer rerouting is automatically propagated to the IP layer definition according to rules which define how the new optical link utilisations affect the properties of the IP layer. These rules may be stored in the data store 90.

As a result of the new IP layer properties, the old set of IP layer routes may no longer be optimal. As a result, GRE1 reroutes the IP demands 92 (step 100) by determining an updated optimum set of routes in the IP layer based on the updated properties of the IP layer. Thus, a failure scenario in the optical layer has been propagated to the IP layer by use of the two GREs exchanging data via a data store such that the output of one GRE (i.e. the updated optical link utilisations) forms an input to another GRE (i.e. the new IP layer properties which result from the updated optical link utilisations).

Figure 10A:
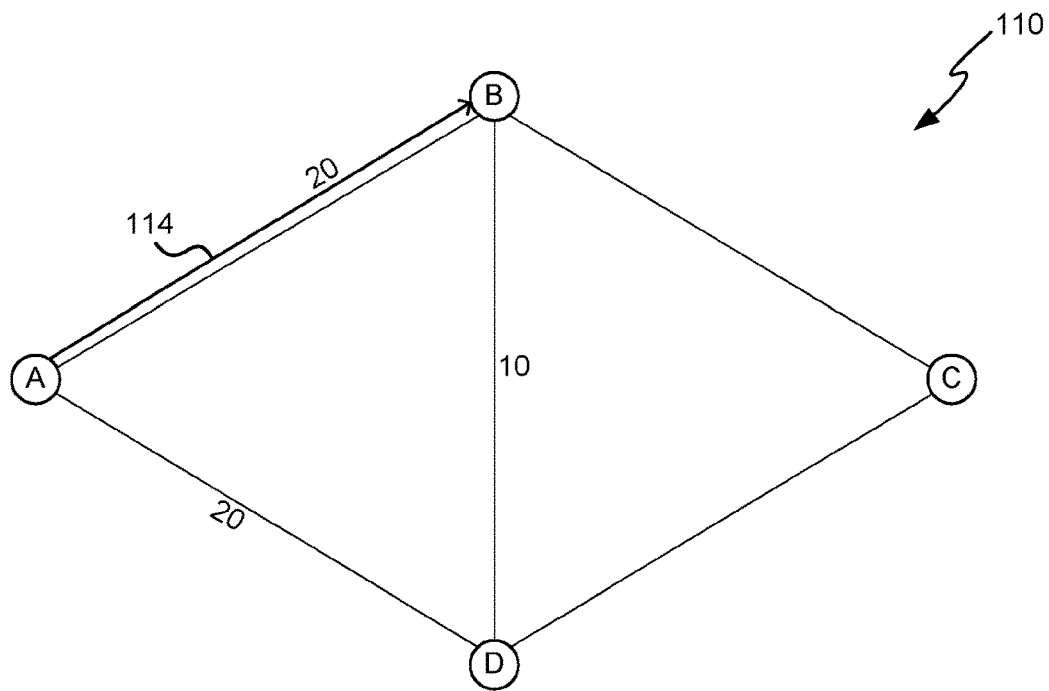
FIGS. 10A, 10B and 10C are network diagrams of a simple example multilayer network illustrating how traffic might flow around a failed link.
Figure 10A:
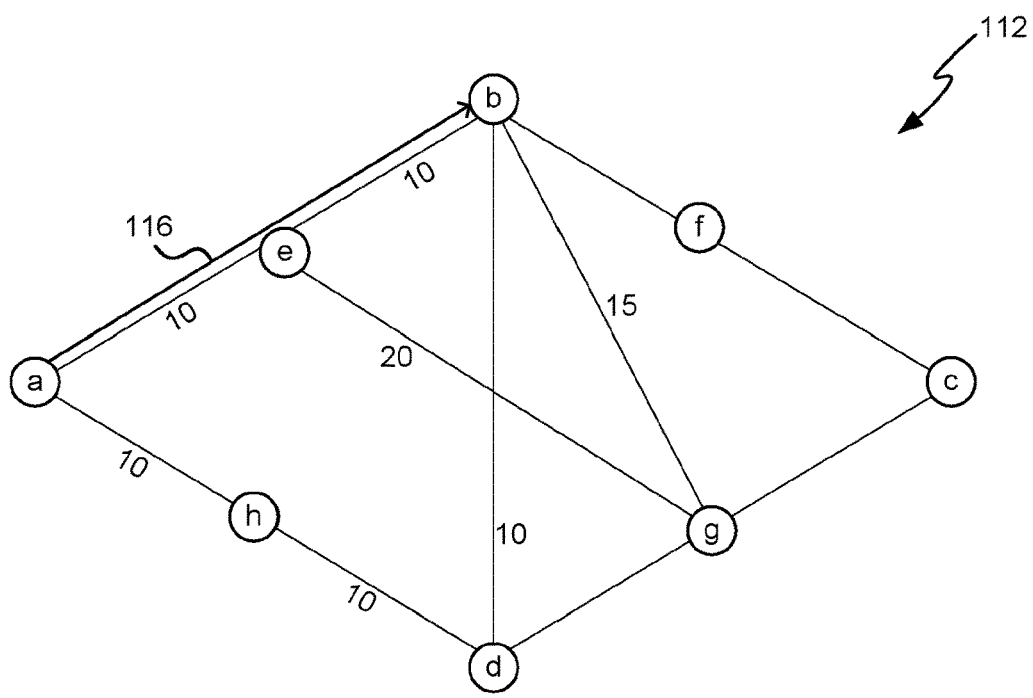

An example failure scenario in a small illustrative multilayer network will now be described. As shown in FIG. 10A, the network has an IP layer 110 with nodes A-D and an optical layer 112 with nodes a-h. A first gateway (not shown) connects optical node a to IP node A, a second gateway connects optical node b to IP node B, and so on. After the setting up phase, a route 114 for transporting data from node A to node B in the IP layer 110 comprises a single forward link directly from A to B. This route 114 is served in the optical layer by a route 116 from node a to node e to node b. Some of the IP and optical links are labelled with a value indicating a cost of using the link. We can see from the optical layer that the cost of using the link a-e is 10 units, and the cost of using the link e-b is also 10 units. As a result, the cost of the whole optical route 116 is 20 units. This means that the cost of the IP layer route 114 is also 20 units since it is served by the optical layer. This is the situation after the setting up phase and before a failure use case is explored.

Figure 10B:
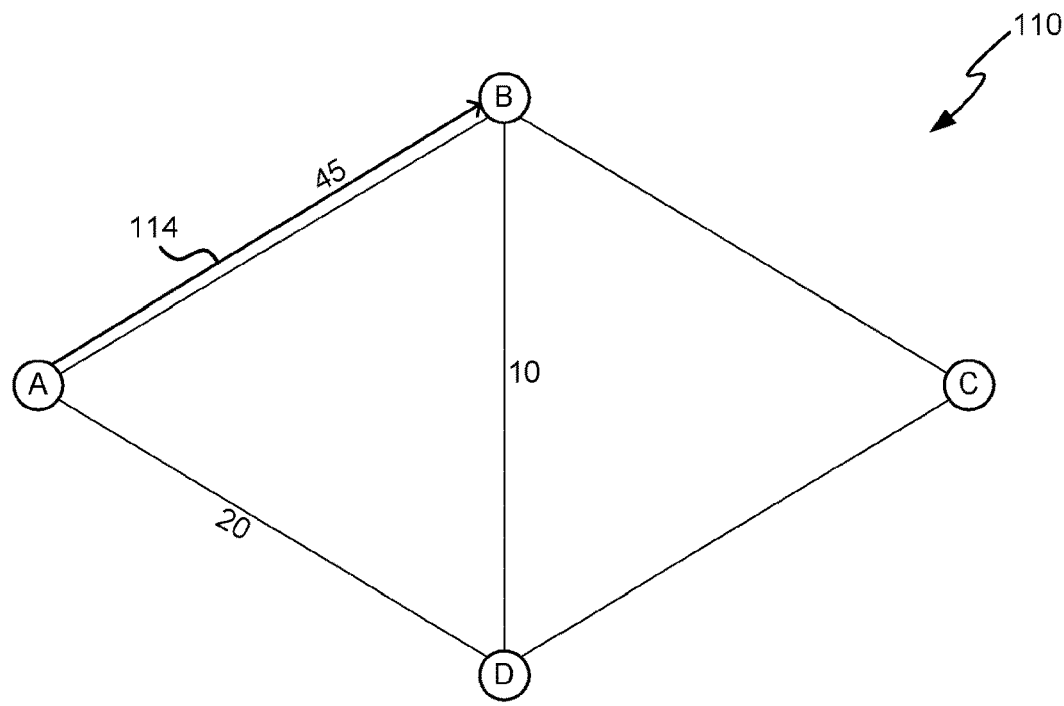
Figure 10B:
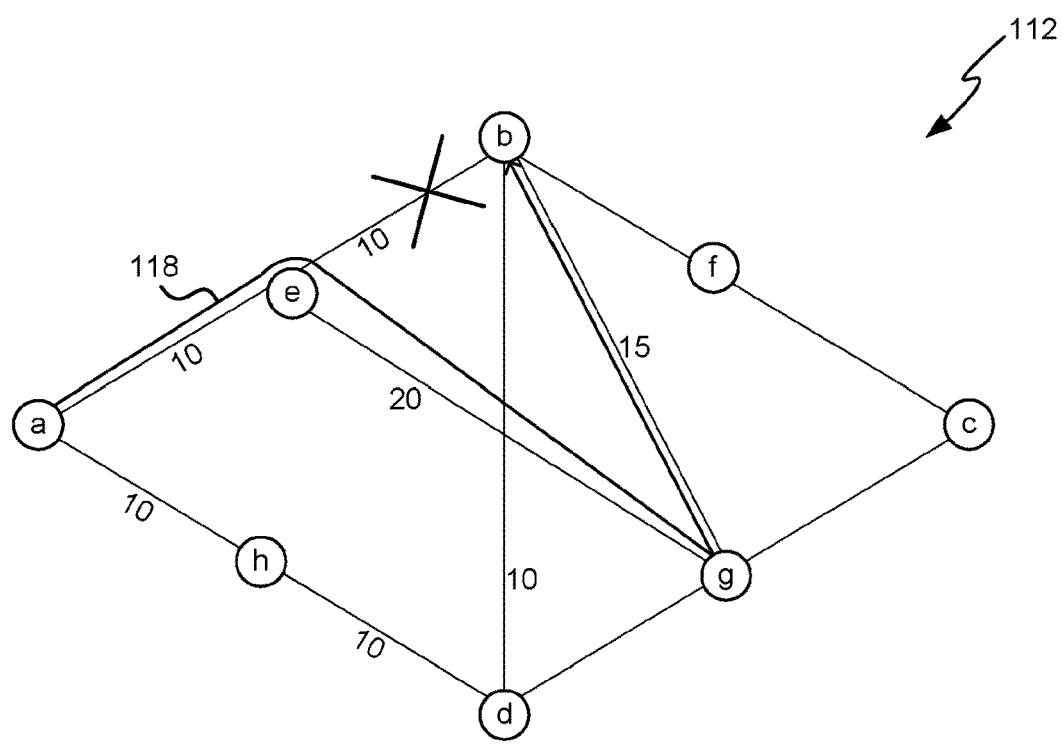

With reference to FIG. 10B, a failure of the link e-b in the optical layer is explored. Traffic in the optical layer is rerouted via node g to generate a new route 118. The new route 118 has a cost of 10+20+15=45 which means that the cost of the link A-B in the IP layer 110 increases to 45 since it is now served by the more expensive optical layer route 118. Thus, a rerouting in the optical layer has changed a property, in this case cost, of a link in the IP layer 110.

Figure 10C:
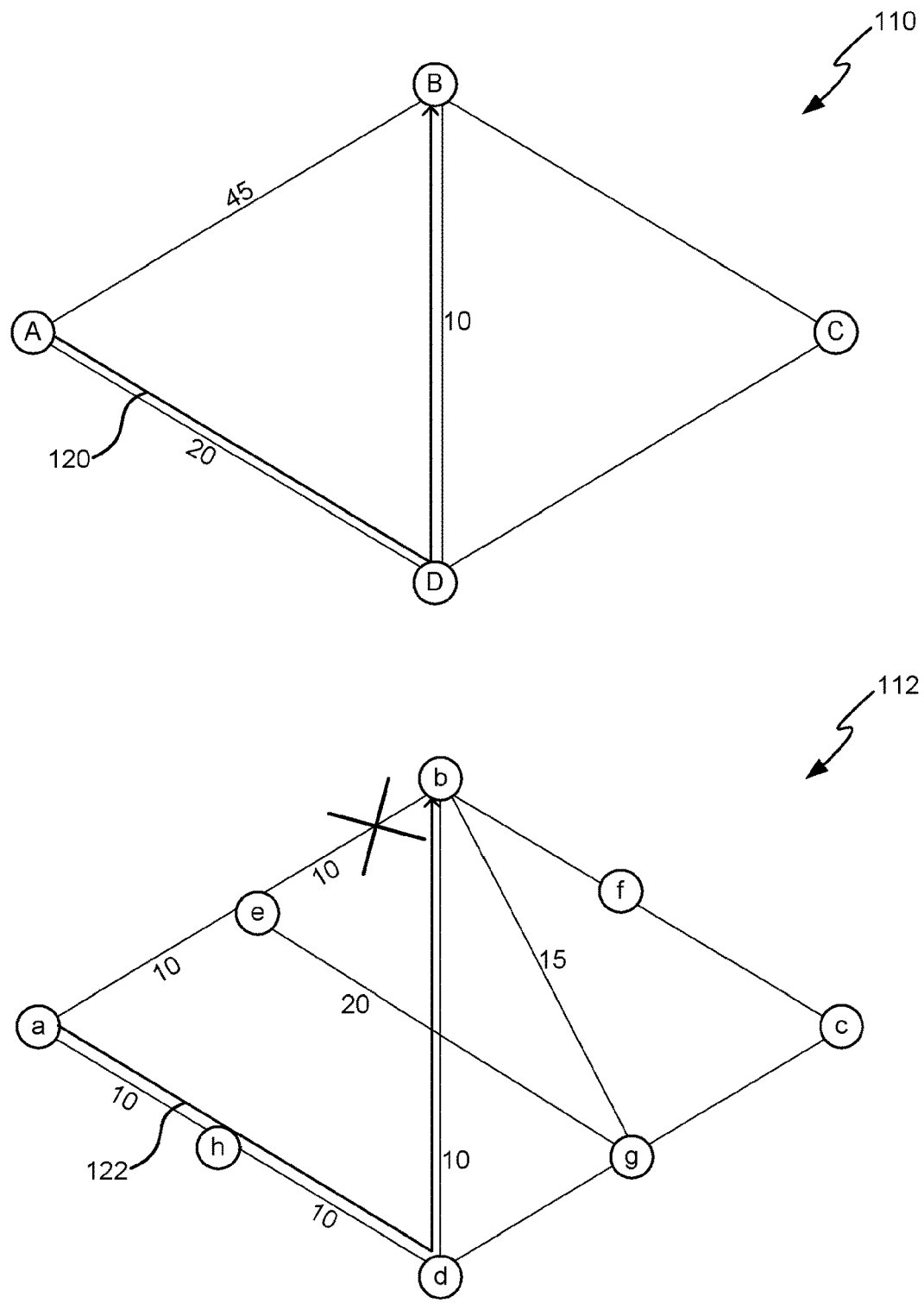

As a result of the new property in the IP layer, the IP layer route 114 is no longer optimal. A new optimal route 120 with a cost of 30 through nodes a-h-d-b is computed for the IP layer 110, as shown in FIG. 10C. A new optimal route 122 in the optical layer is determined for optimally serving the route 120 of the IP layer. In this example the routes have been optimised with respect to cost but any other parameter such as latency could be used. It will also be appreciated that this approach for exploring failure scenarios can be applied to any multilayer network, including multilayer networks with three or more layers such as a network comprising an IP layer, an Ethernet layer and an optical layer.

Figure 1A:
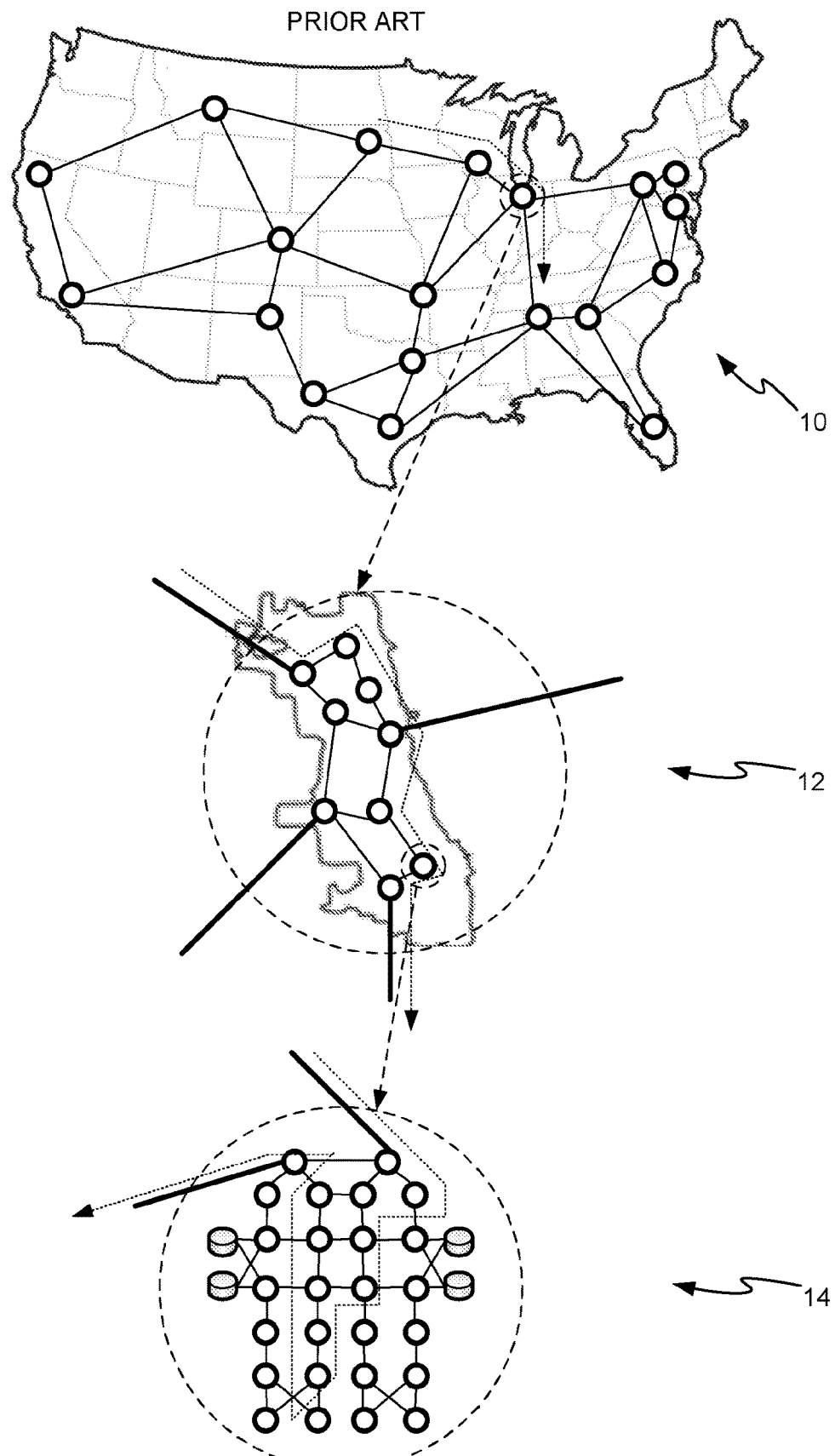
FIG. 1A illustrates network maps for national, regional, and data center domains.
Figure 1B:
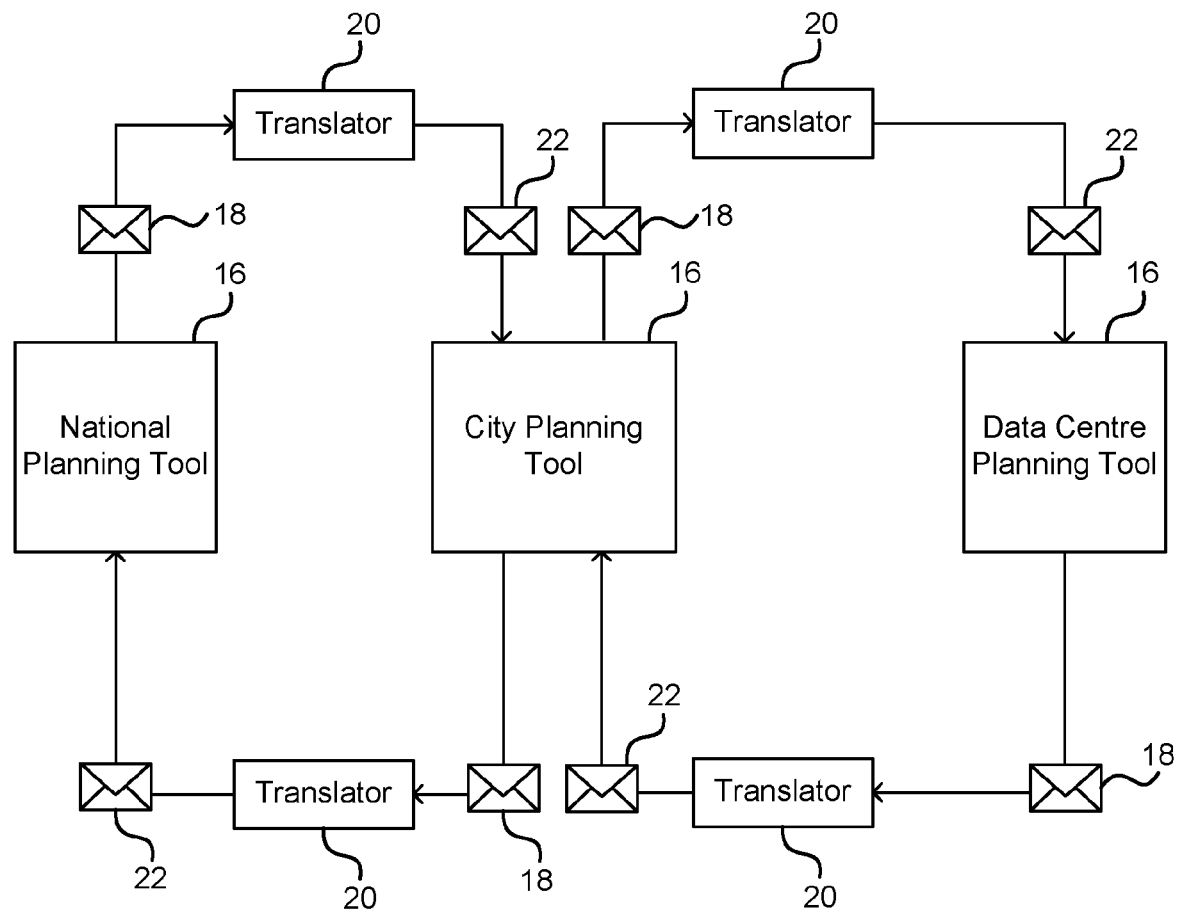
FIG. 1B illustrates a schematic for dialoging between the domains of FIG. 1A.
Figure 2A:
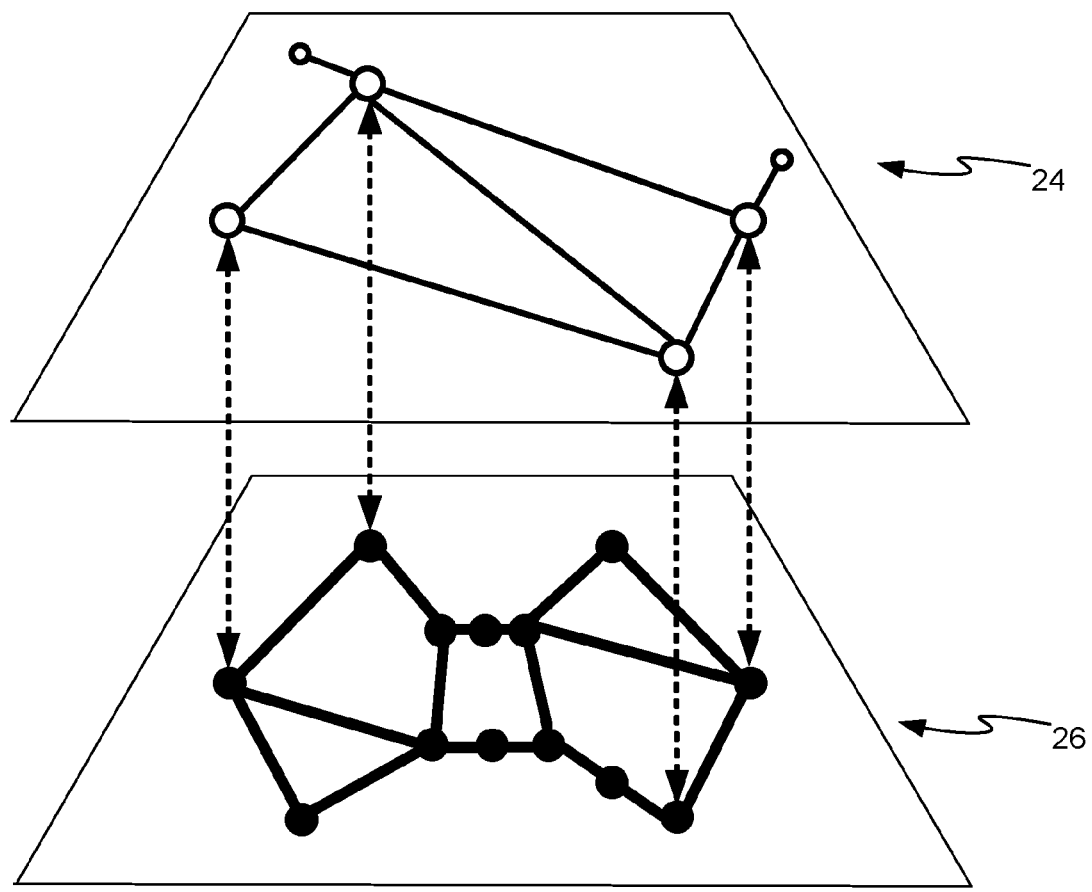
FIG. 2A illustrates a multilayer transport network.
Figure 2B:
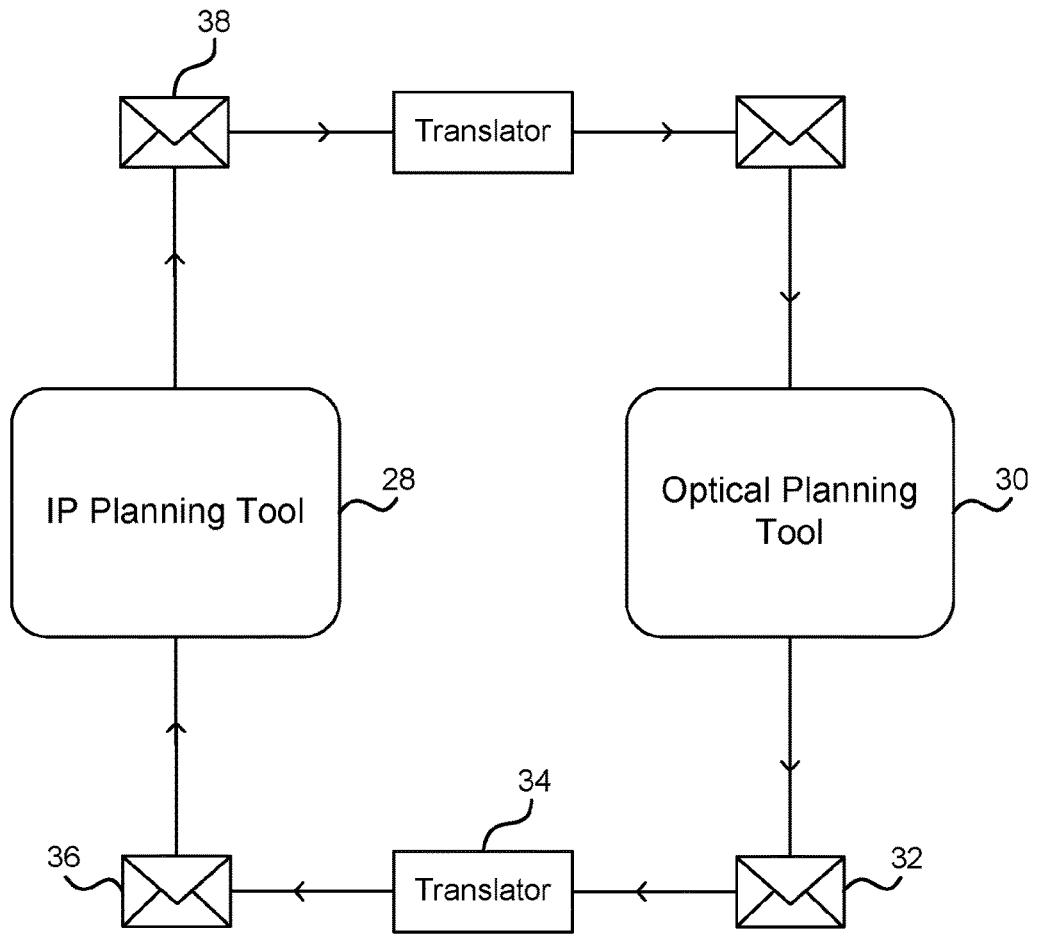
FIG. 2B illustrates a schematic for dialoging between the transport layers of FIG. 2A.
Figure 3A:
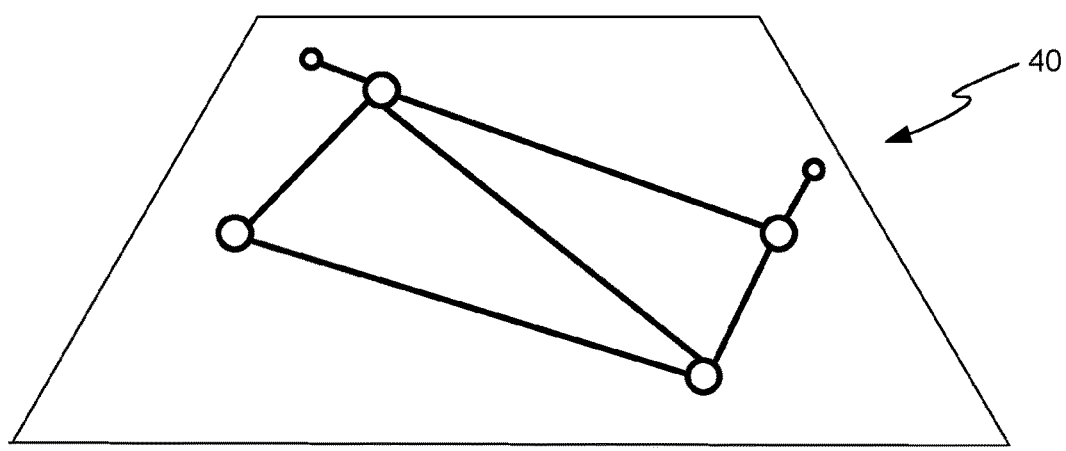
FIG. 3A illustrates an IP network model.
Figure 3B:
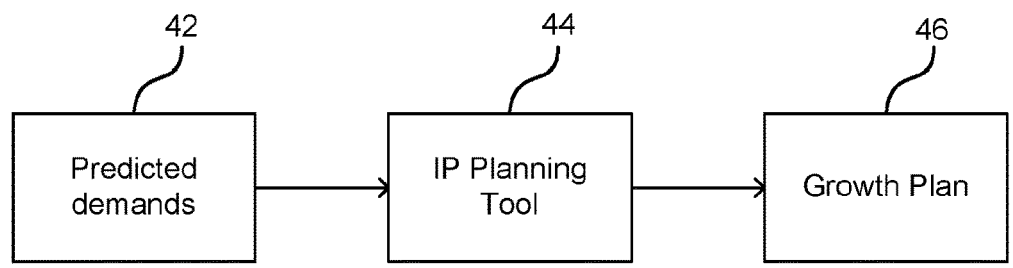
FIG. 3B illustrates a modeling process for the IP network of FIG. 3A.

A complex network modelling problem may also be categorised according to the 'level of detail' of the network—for example a problem of how a failed router in a data centre affects data traffic across an intercity network could be approached by modelling the different domains (e.g. national, each city, each data centre) separately using a common data model. Referring to FIG. 1A the example of the USA and the Chicago city network and a Chicago data centre will be revisited and expanded to include New York City.

Figure 11:
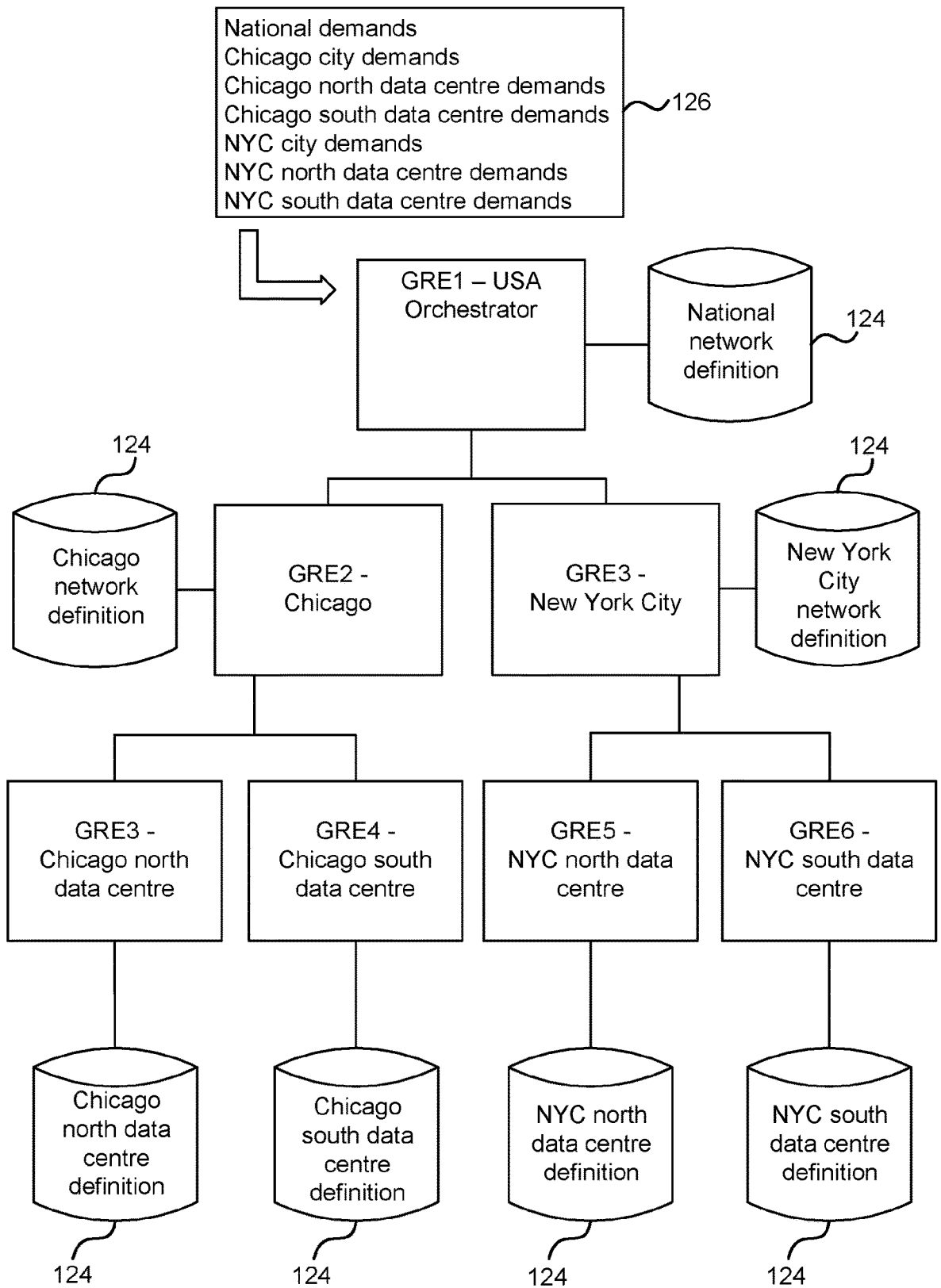
FIG. 11 is a block system diagram showing six GREs networked together for exploring the effect of a failed router in a Chicago data centre on the flow of traffic across Chicago, an intercity USA network, and a New York City network and two New York City data centres in accordance with an embodiment of the invention.

As shown in FIG. 11, the problem may be set up with six GREs: GRE1 allocated for computing intercity routes across the USA; GREs 2 and 3 for the Chicago and New York City networks; GREs 3 and 4 for data centres in the north and south, respectively, of Chicago; and GREs 5 and 6 for data centres in the north and south, respectively, of New York City. Each GRE has access to a data store 124 storing a network definition for the domain (i.e. USA, relevant city or relevant data centre) of the GRE. Demands 126 for each of the six domains are imported by GRE1 acting as orchestrator.

In a similar way for the multilayer network example above, a setting up phase is first performed in which optimised sets of routes are computed for each of the domains by each of the respective GREs on the basis of the relevant network definition and the relevant demands. This produces a backdrop against which failure cases can be explored.

Figure 12:
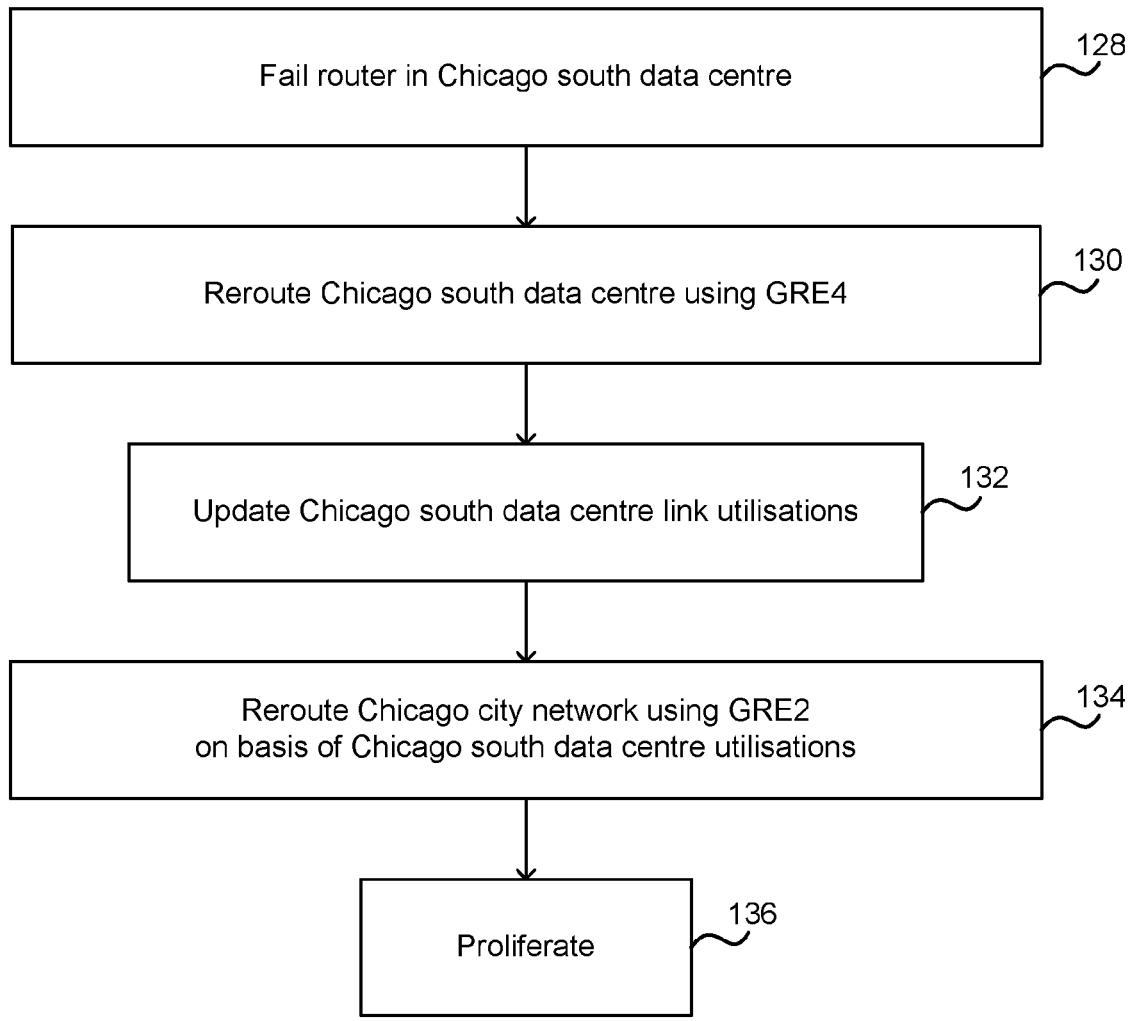
FIG. 12 is a flow chart showing a method of exploring the failed router scenario of FIG. 11.

A method of performing a failure case using the system of FIG. 11 will now be described with reference to FIG. 12. In the data store 124 for the Chicago south data centre, a change is made to the network definition of the data centre to simulate a failed router (step 128). GRE4 generates a new set of optimal routes on the basis of the failed router to model how the traffic in the data centre would flow around the failed router (step 130). The new optimised set of routes provides updated Chicago south data centre link utilisations (step 132) which are sent to the data store 124 of the Chicago south data centre to update the data model. Since the network definitions are distributed across the six data stores 124 in this example, only GRE4 has access to the new Chicago south data centre link utilisations. In order to explore the effects of the failed router in other domains, GRE4 transmits the updated link utilisations to GRE2 for determining the effect on the Chicago city network. The effect on the Chicago city network results from changed link utilisations on the links exiting the data centre network and entering the city network. GRE2 reroutes the Chicago city network on the basis of these changes and generates an updated set of optimised routes across the Chicago network (step 134). This creates new link utilisations in the Chicago city network which are stored in the Chicago city data store 124 and transmitted to connected GREs 1 and 3 for exploring how traffic in those domains is affected. GRE1 will subsequently pass updated link utilisations of the intercity USA network to GRE3 to explore how the New York City network is affected, and GRE3 will pass updated New York City link utilisations to GREs 5 and 6 to determine how the New York City data centres are affected, which completes the proliferation (step 136) of the failure case across all six domains.

Complex routing problems relating to how to grow a network based on predicted demands may also be solved using embodiments of the invention. In this case, instead of dividing the complex problem into smaller routing problems according to network layers or network domains, the problem of growth is divided according to time intervals which will be referred to as epochs. For example, if the epochs are months, there may be a set of predicted demands for November and a set of demands for December, and each month may be allocated a GRE for performing routing computations for that month.

Figure 13:
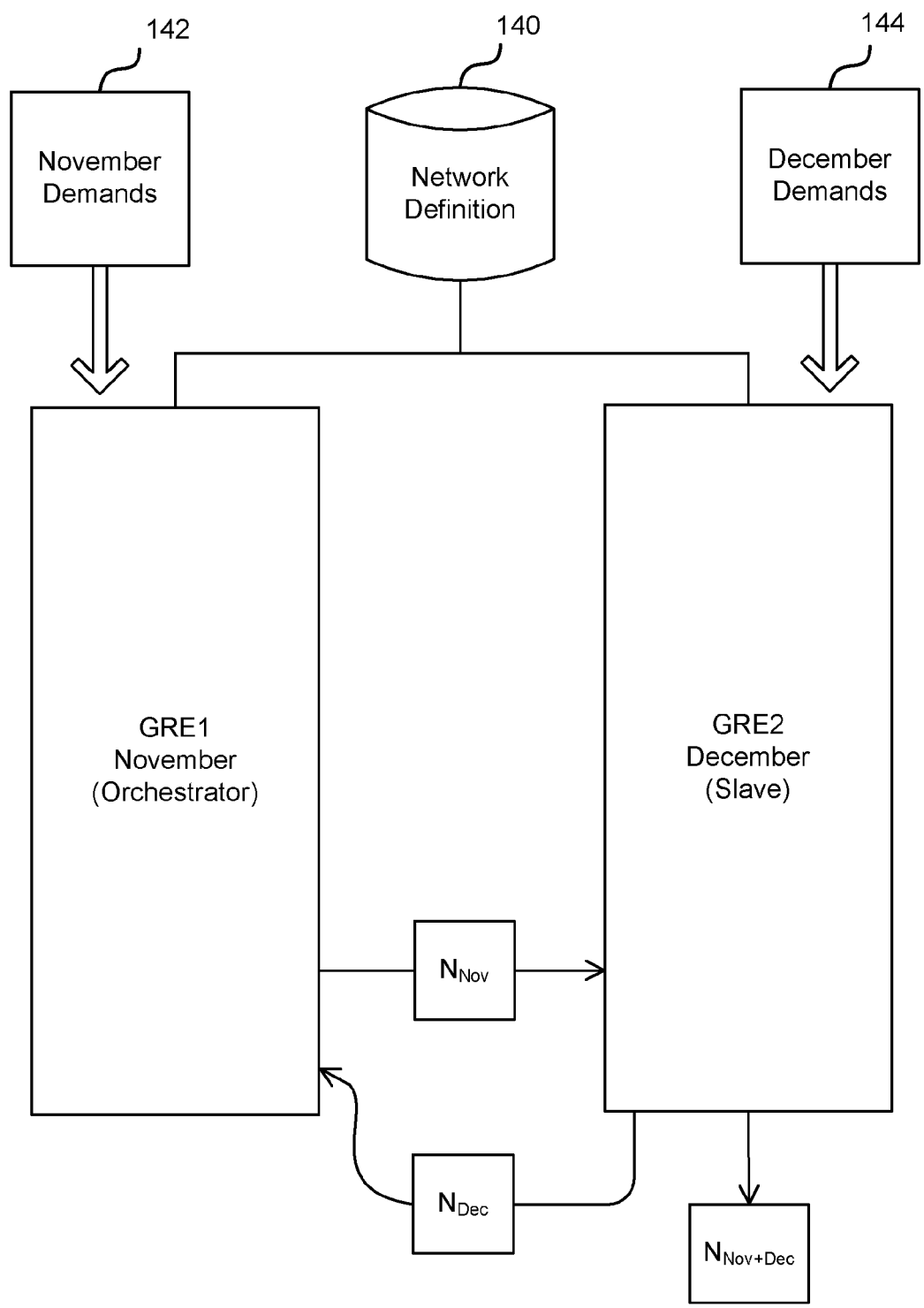
FIG. 13 is a block system diagram showing two GREs networked together for exploring different ways of extending a network to account for predicted increases in service demands.

Taking the simple example of optimising growth based on predicted demands for November and December, GRE1 is allocated for computing routes based on the predicted demands 142 for November and GRE2 is allocated for computing routes based on the predicted demands 144 for December, as shown in FIG. 13. Each GRE is connected to a data store 140 storing a network definition which defines existing network infrastructure together with rights of way and ducts and other forms of capacity which could be filled by network elements such as routers and cabling to allow the network to grow. Predicted demands 142 for November are imported by GRE1 and an optimum set of routes is determined based on the November demands 142 and the network definition 140. The optimum set of routes is likely to include routes through not only the existing infrastructure but also the rights of way and other potential infrastructure that could be built. Thus, routes define an extended network $N_{Nov}$ that could be built to grow the network for future demands. GRE1 transmits the network $N_{Nov}$ to GRE2 which computes an optimum set of routes based on the December demands 144 and the network $N_{Nov}$. Thus, GRE2 computes a network $N_{Nov+Dec}$ that results from extending the network $N_{Nov}$ to account for the December demands 144. The network $N_{Nov+Dec}$ is based on incrementally extending the original network definition 140 each month. Finally, GRE2 computes a set of optimum routes based on the December demands 144 and the network definition 140. This produces a definition of an extended network $N_{Dec}$ based solely on the December demands 144 rather than on incrementally growing the network each month.

This process delivers three options for growing the network: the network could be extended solely on the basis of the November demands 142, solely on the basis of the December demands 144, or incrementally based on the November demands 142 followed by the December demands 144.

An assessment can then be made as to which option is the most favourable. Relevant factors to be taken into consideration include the cost of the network extension and how well the network extension meets the predicted demands of each of the months. For example, the network $N_{Dec}$ is likely to better meet the December demands 144 than the network $N_{Nov+Dec}$, but the upfront costs of building $N_{Dec}$ might be higher. Furthermore, networks $N_{Nov}$ and $N_{Nov+Dec}$ have both been built to suit the November demands 142 but it is not clear how well $N_{Dec}$ would serve the November demands 142. In order to check this, GRE2 transmits $N_{Dec}$ to GRE1 so that GRE1 can compute an optimum set of routes based on the November demands 142 and the network $N_{Dec}$. At this point a cost/benefit analysis can be conducted and it can be determined for how many months ahead the network should be extended. If it is decided to extend the network to account for two months' predicted demands, it must also be decided which of the two extended networks $N_{Dec}$ and $N_{Nov+Dec}$ to build.

Figure 14:
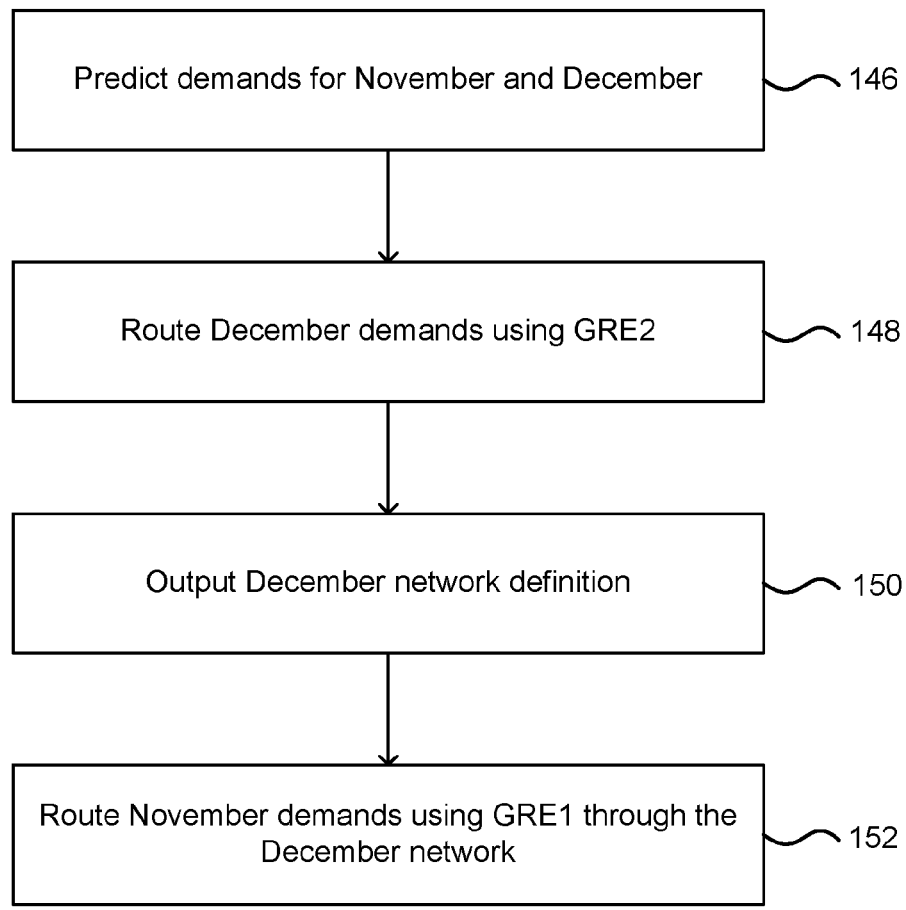
FIG. 14 is a flow chart showing a method of exploring network growth scenarios using the system of FIG. 13.

The process of generating an optimum future network and feeding it back to another GRE for checking how well it serves earlier predicted demands is summarised in FIG. 14. Network demands are predicted for November and December (step 146). GRE2 routes the December demands (step 148) based on the current state of the network and outputs a December network definition (step 150). Finally, in order to check how well the December network serves the November demands, GRE1 routes the November demands through the December network (step 152) by computing an optimum set of routes through the December network based on the November demands.

Figure 15:
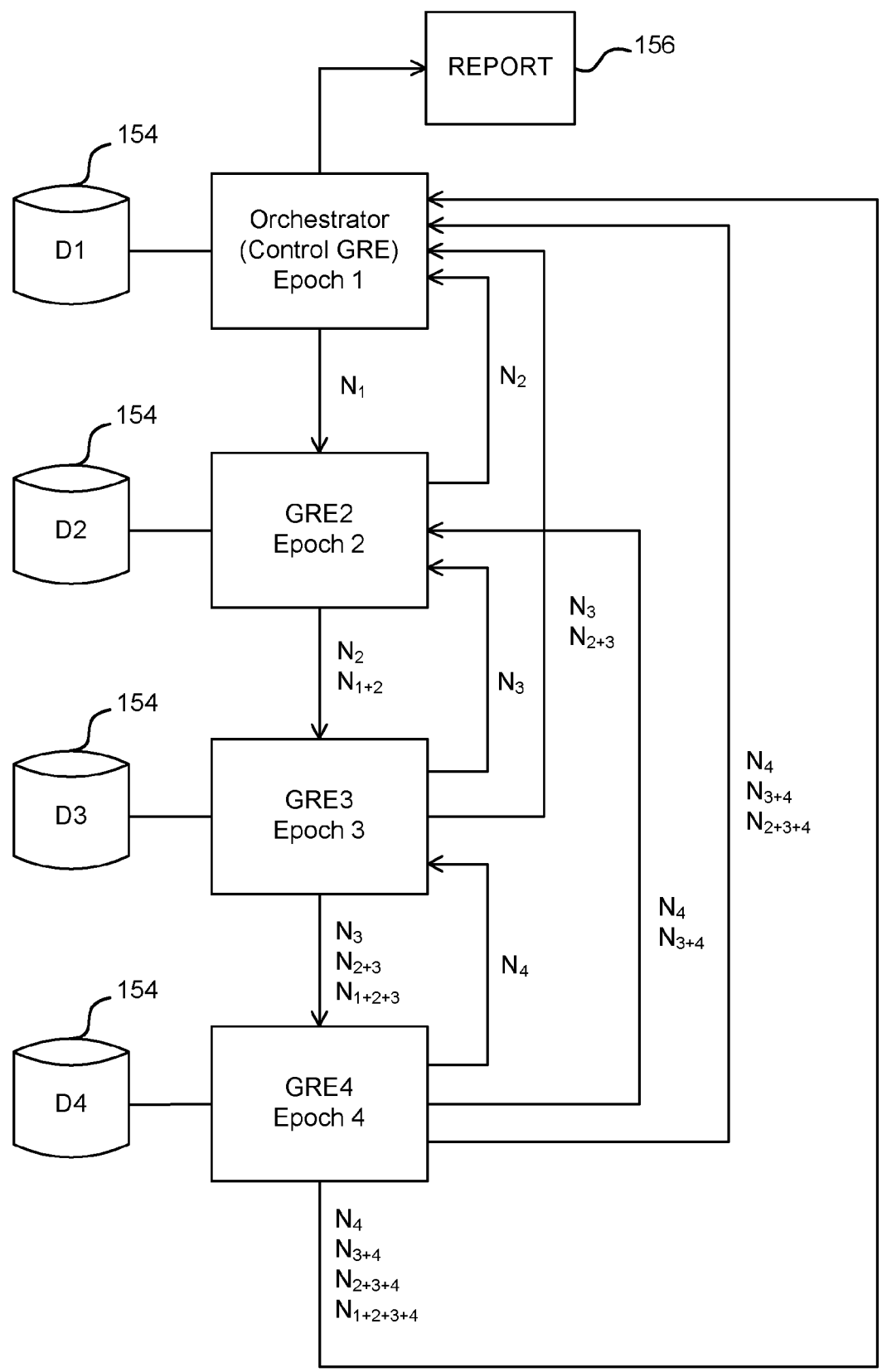
FIG. 15 is a block system diagram showing four GREs networked together for exploring further network growth scenarios in accordance with an embodiment of the invention.

This approach of generating definitions of extended networks, including both incrementally extended networks and networks extended in one large 'hop', and checking how well network extensions created in a single step meet earlier predicted demands, may be applied in more complex scenarios involving many sets of predicted demands For example, referring to FIG. 15, a system is shown for performing a complex routing problem consisting of determining how many epochs ahead to plan a network extension and in what way—incrementally or in large hops or a mixture. A first GRE acting as orchestrator performs routing for epoch 1 and coordinates the activities of three other GREs. GREs 2, 3 and 4 are for routing predicted demands for epochs 2, 3 and 4, respectively. Each GRE is connected to a data store 154 storing a demand matrix (D1-D4) expressing predicted demands for the relevant epoch.

The method is simply an extension of the method performed by the system of FIG. 13 in which predicted demands for two months are explored. Each GRE produces a network based on the demands for its epoch and the current state of the network. For example, the orchestrator creates a network $N_1$ based on the predicted demands D1 for epoch 1 and the current state of the network. Each GRE performs a corresponding computation, thus determining network definitions $N_2$, $N_3$ and $N_4$. Each of these networks are created in a 'single hop' rather than incrementally, and as such, the networks $N_2$, $N_3$ and $N_4$ are fed back to lower-numbered GREs to check how well they serve the earlier predicted demands. The networks $N_1$, $N_2$, and $N_3$ are forwarded to higher-numbered GREs for computing various incrementally grown networks. For example, a network $N_{1+2+3}$ is computed for incrementally extending the current network first based on D1, then based on D2, and then based on D3. Similarly, the network $N_{3+4}$ defines extending the current network first based on D3 and then based on D4. Any network definition that has not been computed based on a particular demand matrix—e.g. $N_{3+4}$ has not been built based on D1 or D2—is looped back to the relevant GREs (in this case the orchestrator and GRE2) for checking how well it serves those earlier demands D1 and D2.

Once all the networks have been built and checked, the results are collated by the orchestrator which generates and outputs a report 156. The orchestrator may evaluate the network definitions, for example by computing a fitness function for each of them and indicate, for example, the top five extended networks with various of their characteristic such as costs in the report 156. The fitness function could give an indication of how well, on average, earlier predicated demands are served. Alternatively, the fitness function could indicate how well each of the extended networks copes with various failure scenarios. In any case, the report 156 may be provided such that a customer such as a network operator may make an informed decision on how far ahead to extend the network for and what form—incremental, large hops or mixed—the extension should take.

Functions relating to modelling a network for the purpose of scenario exploration may be implemented on computers connected for data communication via the components of a packet data network. Although special purpose devices may be used, such devices also may be implemented using one or more hardware platforms intended to represent a general class of data processing device commonly used so as to implement the event identification functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. energy usage measurements for a time period already elapsed. The software code is executable by the general-purpose computer that functions as the server or terminal device used for modelling a network. In operation, the code is stored within the general-purpose computer platform. At other times, however, the software may be stored at other locations and/or transported for loading into the appropriate general-purpose computer system. Execution of such code by a processor of the computer platform or by a number of computer platforms enables the platform(s) to implement the methodology for modelling a network, in essentially the manner performed in the implementations discussed and illustrated herein.

Those skilled in the art will be familiar with the structure of general purpose computer hardware platforms. As will be appreciated, such a platform may be arranged to provide a computer with user interface elements, as may be used to implement a personal computer or other type of work station or terminal device. A general purpose computer hardware platform may also be arranged to provide a network or host computer platform, as may typically be used to implement a server.

For example, a server includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications.

A user terminal computer will include user interface elements for input and output, in addition to elements generally similar to those of the server computer, although the precise type, size, capacity, etc. of the respective elements will often different between server and client terminal computers. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of modelling a network outlined above may be embodied in programming. Program aspects of the technology may be thought of as "products" or "articles of manufacture" typically in the form of executable code and/or associated data that is carried on or embodied in a type of machine readable medium and/or in a plurality of such media. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the organisation providing modelling a network services into the modelling a network computer platform. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the modelling a network, etc. shown in the drawings. Volatile storage media include dynamic memory, such as main memory of such a computer platform. Tangible transmission media include coaxial cables; copper wire and fibre optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A computerized method of simulating a scenario in a telecommunications network, the method comprising:
   generating a network definition expressed in a common data model readable by first and second routing engines;
   generating a set of demand matrices describing demands on the network;
   incorporating a scenario definition into one or more of the network definition and the demand matrices;
   automatically determining a first aspect of a new network state associated with the scenario definition by determining a first optimised set of routes using the first routing engine based on the network definition and at least one of the demand matrices; and
   automatically determining a second aspect of the new network state by determining a second optimised set of routes using the second routing engine based on the first optimised set of routes and at least one other of the demand matrices.

2. A method according to claim 1, comprising controlling the determining of the first and second optimised sets of routes using a control module.

3. A method according to claim 1, comprising the routing engine retrieving the scenario definition from a database.

4. A method according to claim 1, wherein each of the first and second routing engines is a generic routing engine.

5. A method according to claim 1, wherein the scenario definition comprises a failed network element.

6. A method according to claim 5, wherein the failed network element comprises a failed network link.

7. A method according to claim 5, wherein the new network state comprises an adapted network state comprising adapted routing of traffic around the failed network element.

8. A method according to claim 7, wherein the network comprises a plurality of layers and the first aspect of the new network state comprises adapted routing of traffic in a same layer as the failed network element.

9. A method according to claim 8, wherein the second aspect of the new network state comprises adapted routing of traffic in a different layer as the failed network element.

10. A method according to claim 9, wherein the adapted routing of traffic in the different layer is based on adapted properties of the different layer.

11. A method according to claim 10, wherein the adapted properties of the different layer are based on the adapted routing of traffic in the same layer as the failed network element.

12. A method according to claim 11, wherein the adapted properties of the different layer comprise adapted capacities, latencies or costs of routes in the different layer.

13. A method according to claim 12, comprising inputting an output of the second routing engine into a third routing engine for determining adapted routing of traffic in a further different layer of the network.

14. A method according to claim 5, wherein the network comprises a plurality of domains and the first aspect of the new network state comprises adapted routing of traffic in a same domain as the failed network element.

15. A system for simulating a scenario in a telecommunications network, the system comprising a processor based system and non-transitory processor readable storage media, the storage media storing processor executable instructions which define:
   network definition module for generating a network definition expressed in a common data model readable by first and second routing engines;
   a demands module for generating a set of demand matrices describing demands on the network;
   a scenario definition module for incorporating a scenario definition into one or more of the network definition and the demand matrices;
   a first routing engine for automatically determining an aspect of a new network state associated with the scenario definition by determining a first optimised set of routes based on the network definition and one of the demand matrices; and
   a second routing engine for automatically determining a further aspect of the new network state by determining a second optimised set of routes based on the first optimised set of routes and another of the demand matrices.

16. A system according to claim 15, wherein the first and second routing engines have a master-slave relationship in which one of the first and second routing engines comprises a control module for controlling the other.

17. A system according to claim 15, wherein the first and second routing engines are both controlled by a control module.

18. A system according to claim 15, comprising a common database accessible by each routing engine for storing the network definition, the demand matrices, and/or the scenario definition.

19. A system according to claim 15, comprising, for each routing engine, a respective database accessible by the each routing engine for storing a respective subset of the network definition, the demand matrices, and/or the scenario definition.

20. A non-transitory processor readable storage medium containing processor executable instructions that when executed by a processor based system causes the system to simulate a scenario in a telecommunications network by:

generating a network definition expressed in a common data model readable by first and second routing engines;
generating a set of demand matrices describing demands on the network;
incorporating a scenario definition into one or more of the network definition and the demand matrices;
automatically determining a first aspect of a new network state associated with the scenario definition by determining a first optimised set of routes using the first routing engine based on the network definition and at least one of the demand matrices; and
automatically determining a second aspect of the new network state by determining a second optimised set of routes using the second routing engine based on the first optimised set of routes and at least one other of the demand matrices.

* * * * *